US008701503B2

United States Patent
Shimizu et al.

(10) Patent No.: US 8,701,503 B2
(45) Date of Patent: Apr. 22, 2014

(54) MAGNETOSTRICTIVE TORQUE SENSOR AND ELECTRICAL POWER STEERING DEVICE

(75) Inventors: Yasuo Shimizu, Shimotsuke (JP);
Atsuhiko Yoneda, Utsunomiya (JP);
Yutaka Arimura, Utsunomiya (JP);
Yoshihiro Oniwa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 230 days.

(21) Appl. No.: 13/258,046

(22) PCT Filed: Mar. 31, 2010

(86) PCT No.: PCT/JP2010/055870
§ 371 (c)(1),
(2), (4) Date: Sep. 21, 2011

(87) PCT Pub. No.: WO2010/119773
PCT Pub. Date: Oct. 21, 2010

(65) Prior Publication Data
US 2012/0018241 A1   Jan. 26, 2012

(30) Foreign Application Priority Data

Apr. 17, 2009   (JP) .................................. 2009-101049

(51) Int. Cl.
*G01L 3/02* (2006.01)
(52) U.S. Cl.
USPC ..................................................... 73/862.333
(58) Field of Classification Search
USPC ...................................... 73/862.331–862.333
See application file for complete search history.

(56) References Cited

U.S. PATENT DOCUMENTS

| 5,526,704 | A | * | 6/1996 | Hoshina et al. | 73/862.335 |
| 5,622,436 | A | * | 4/1997 | Morita et al. | 384/448 |
| 5,779,368 | A | * | 7/1998 | Morita et al. | 384/448 |
| 6,046,583 | A | * | 4/2000 | Ayres et al. | 324/146 |
| 6,484,592 | B2 | | 11/2002 | Sezaki | |
| 6,541,958 | B2 | * | 4/2003 | Harada | 324/174 |
| 7,624,653 | B2 | * | 12/2009 | Watanabe et al. | 73/862.331 |
| 8,225,483 | B2 | * | 7/2012 | Watanabe et al. | 29/595 |
| 2004/0194559 | A1 | | 10/2004 | Nakamura et al. | |
| 2013/0152703 | A1 | * | 6/2013 | Arimura et al. | 73/862.333 |

FOREIGN PATENT DOCUMENTS

| JP | 4-158232 A | 6/1992 |
| JP | 8-114515 A | 5/1996 |
| JP | 2001-296193 A | 10/2001 |
| JP | 2004-264188 A | 9/2004 |
| JP | 2004-309184 A | 11/2004 |

* cited by examiner

*Primary Examiner* — Max Noori
(74) *Attorney, Agent, or Firm* — Carrier Blackman & Associates, P.C.; Joseph P. Carrier; William D. Blackman

(57) ABSTRACT

Disclosed are a magnetostrictive torque sensor and an electrical power steering device, wherein a first torque sensor has: one magnetostrictive film provided on a steering shaft; a first coil and a second coil that detect changes in the magnetic characteristics of the magnetostrictive film; and a first housing that contains, at least, the steering shaft, the magnetostrictive film, the first coil, and the second coil. The first housing has a resin part, a cylindrical part made of a metal that is soft magnetic, and a flange part made of a metal that is soft magnetic. The resin part, the cylindrical part, and the flange part are formed as a unit.

14 Claims, 32 Drawing Sheets

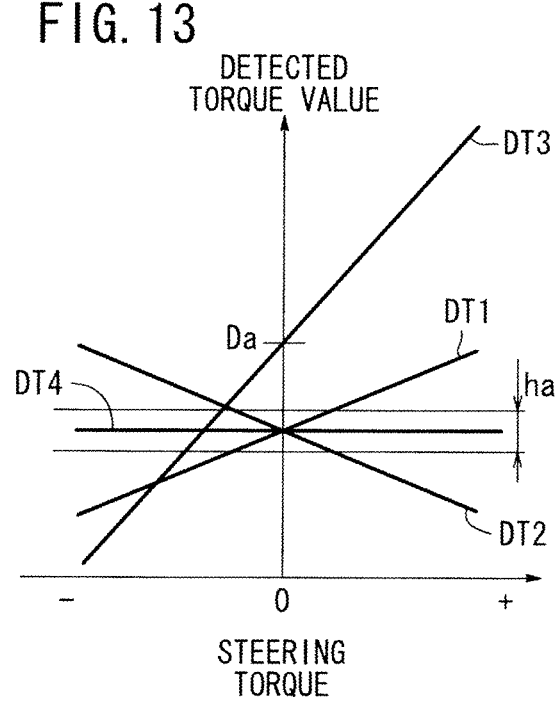

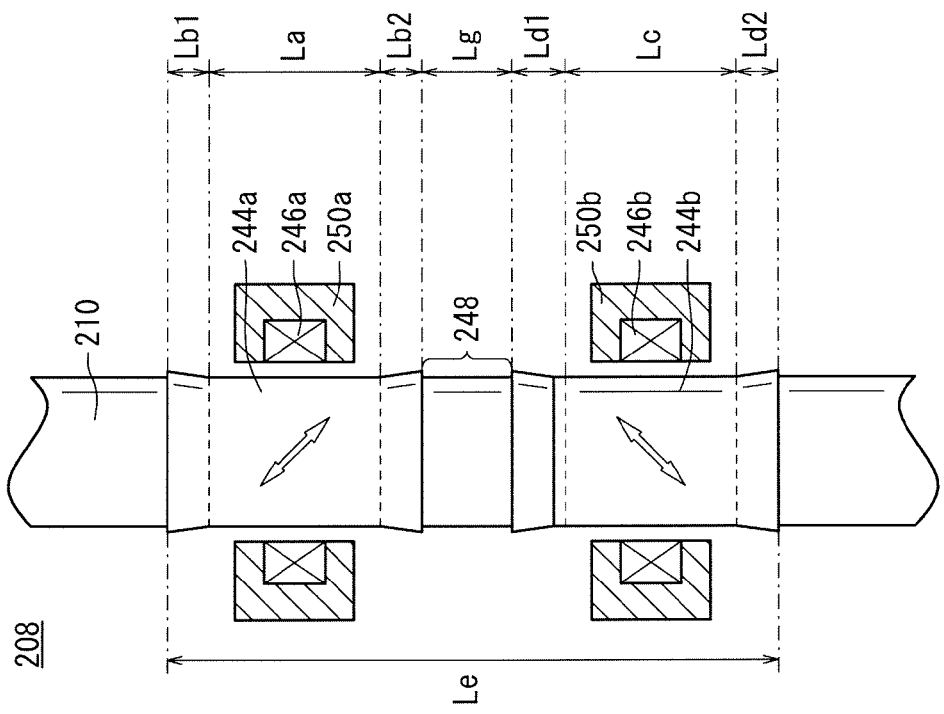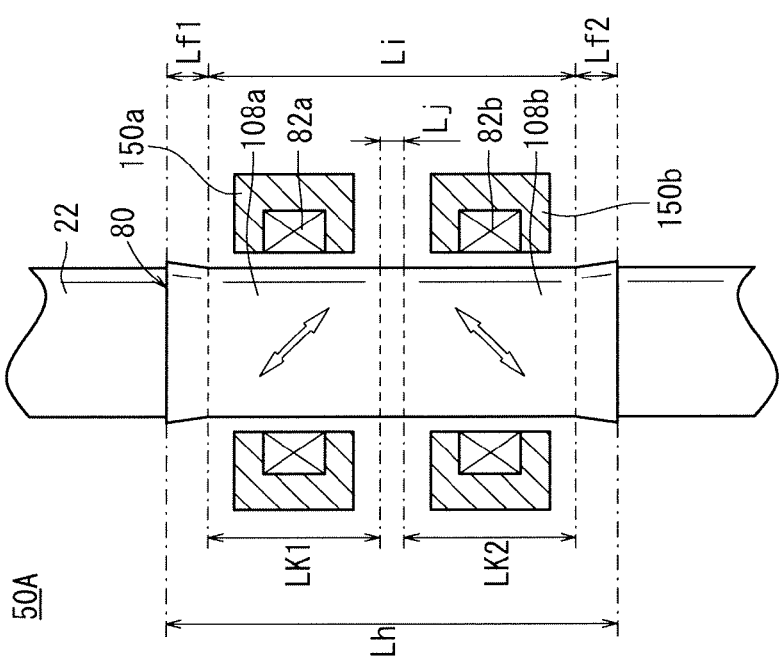

MAGNETOSTRICTIVE TORQUE SENSOR AND ELECTRICAL POWER STEERING DEVICE

TECHNICAL FIELD

The present invention relates to a magnetostrictive torque sensor for detecting torque based on a change in magnetic properties due to magnetostriction, and an electrically operated power steering apparatus including such a magnetostrictive torque sensor therein.

BACKGROUND ART

One known type of contactless torque sensor is a magnetostrictive torque sensor for detecting torque based on a change in magnetic properties due to magnetostriction. Such a magnetostrictive torque sensor is used to detect the steering torque of an automotive steering apparatus (see Japanese Laid-Open Patent Publication No. 2004-309184).

The magnetostrictive torque sensor of the type described above comprises two magnetostrictive films (a first magnetostrictive film and a second magnetostrictive film) mounted on a shaft and having different magnetic anisotropic properties, and a first shaft and a second shaft, which are disposed in confronting relation to the first magnetostrictive film and the second magnetostrictive film, respectively. When a torque (twist) is applied to the shaft to thereby twist the shaft, magnetic permeabilities of the first and second magnetostrictive films change, thereby changing inductances in the first and second detecting coils. Therefore, the torque can be detected as changes in impedance or induced voltages of the first and second detecting coils.

SUMMARY OF THE INVENTION

With conventional magnetostrictive torque sensor disclosed in Japanese Laid-Open Patent Publication No. 2004-309184, a steering shaft is rotatably supported by bearings in a housing made of an aluminum alloy. The first magnetostrictive film and the second magnetostrictive film are formed by plating on the outer circumferential surface of an axially central region of the steering shaft. The first coil and the second coil are disposed in confronting relation to the first magnetostrictive film and the second magnetostrictive film, respectively. The first coil and the second coil have respective windings, ends of which are connected to pins of a connector that is separate from the housing. When the first coil and the second coil are energized with an alternating current supplied through the connector, a change in the magnetic permeabilities of the first and second magnetostrictive films depending on the steering torque is converted into an impedance change, which in turn is converted into an electric signal for detecting the steering torque.

After a resin-made bobbin, which houses the first coil and the second coil each in the form of multiple windings, is inserted into the aluminum alloy housing, respective leading and trailing ends of the first coil and the second coil are placed together in the vicinity of an insertion hole of the connector.

Before the connector, which is electrically insulated, is inserted from outside of the housing, the leading and trailing ends of the first coil and the second coil, which are placed together in the vicinity of the insertion hole of the connector, are connected to the pin. Then, the connector is fixed to the housing by a bolt or the like.

At this time, the leading and trailing ends of the first coil and the second coil may possibly be brought into contact with the aluminum alloy housing, resulting in a conduction failure.

One solution to the above problem is a torque sensor 300, which has a structure as shown in FIG. 31, for example. A first coil 304a and a second coil 304b, which are placed on a resin-made bobbin 302, have leading and trailing ends, respectively, connected to corresponding pins 308 of a connector 306, and the entire assembly including the connector 306 is molded into a resin-made housing 310. Then, the resin-made housing 310 is fastened by bolts 314 (e.g., three bolts) to an aluminum alloy lid 312, which in turn is fastened by bolts 316 to a second aluminum alloy housing 318. This structure solves the conduction failure referred to above. Two magnetostrictive films (i.e., a first magnetostrictive film 322a and a second magnetostrictive film 322b) having different magnetic anisotropies are disposed on a steering shaft 320.

Gasoline automobiles and motor-powered electric automobiles, for example, have electromagnetic devices therein, including an electric generator, a fuel injector solenoid, an electric motor, etc., disposed around the torque sensor. As indicated by the solid line shown in FIG. 32, such electromagnetic devices pose a new problem, in that alternating magnetic fluxes $\phi$ pass through the steering shaft 320, the first magnetostrictive film 322a, the second magnetostrictive film 322b, the first coil 304a, and the second coil 304b, tending to add noise to the torque detection signal. The conventional magnetostrictive torque sensor referred to above also suffers from the same problem.

If such a magnetostrictive torque sensor is incorporated into an electrically operated power steering apparatus, vibrations induced by noise are transmitted from an assistive motor to the steering wheel, which is gripped by the driver, and thus the driver fails to experience a smooth steering sensation.

Such noise may be removed by a low-pass filter. However, since the low-pass filter tends to delay the torque detection signal, the torque detection signal is liable to become less responsive. Therefore, the magnetostrictive torque sensor fails to produce an output signal having a wide dynamic range.

It is an object of the present invention to provide a magnetostrictive torque sensor, which will solve the above problems, and an electrically operated power steering apparatus, which incorporates a magnetostrictive torque sensor therein for imparting an improved steering sensation.

[1] According to a first invention, there is provided a magnetostrictive torque sensor comprising a magnetostrictive member disposed on a shaft member, coils for detecting a change in a magnetic property of the magnetostrictive member, and a housing accommodating therein at least the shaft member, the magnetostrictive member, and the coils, wherein the housing includes a resin part, a tubular part made of metal, and a flange made of metal, the resin part, the tubular part, and the flange being formed together integrally.

With the above arrangement, alternating magnetic fluxes do not pass through the shaft member, the magnetostrictive member, or the coils, so that the magnetostrictive torque sensor is less susceptible to alternating magnetic fields, thus leading to an increase in accuracy with which the steering torque is detected.

[2] In the first invention, the tubular part may be made of a soft magnetic metal, and the flange may also be made of a soft magnetic metal. With this arrangement, alternating magnetic fluxes pass through the flange and the tubular part, but do not pass through the shaft member, the magnetostrictive film, or the coils, so that the magnetostrictive torque sensor is less susceptible to alternating magnetic fields.

[3] In the first invention, the tubular part may be made of a nonmagnetic metal, and the flange may also be made of a nonmagnetic metal. With this arrangement, alternating magnetic fluxes pass outside of the tubular part and the flange, but do not pass through the shaft member, the magnetostrictive film, or the coils, so that the magnetostrictive torque sensor is less susceptible to alternating magnetic fields.

[4] In the first invention, the tubular part and the flange may be integrally made of the same metal. The tubular part and the flange thus make up a single metal member. As a result, alternating magnetic fluxes easily pass through the metal member or outside of the metal member, so that the magnetostrictive torque sensor is much less susceptible to alternating magnetic fields.

[5] In the first invention, the housing may include a first housing member disposed near an end of the shaft member at a position housing therein the magnetostrictive member and the coils, the first housing member having the resin part, the tubular part, and the flange, and a second housing member made of metal disposed near another end of the shaft member. The tubular part may be positioned within a region of the first housing member, which houses the coils therein, the flange may be positioned at a junction between the first housing member and the second housing member, and the resin part may be positioned between the coils and the tubular part.

[6] In the first invention, the tubular part may be inclined with respect to an axial direction of the shaft member. The gradient of the tubular part can be used to collect and guide alternating magnetic fluxes toward the distal end of the shaft member. Consequently, alternating magnetic fluxes are less likely to pass through the shaft member, the magnetostrictive film, or the coils, so that the magnetostrictive torque sensor is less susceptible to alternating magnetic fields.

[7] In the first invention, the magnetostrictive member and the coils may be disposed near one end of the shaft member, and the tubular part may have an opening near the one end of the shaft member and an opening near another end of the shaft member, the opening near the one end of the shaft member being smaller in size than the opening near the other end of the shaft member. With this arrangement, since alternating magnetic fluxes are collected and guided toward the distal end of the shaft member, alternating magnetic fluxes are less likely to pass through the shaft member, the magnetostrictive film, or the coils, so that the magnetostrictive torque sensor is less susceptible to alternating magnetic fields.

[8] In the first invention, the housing may further include an external connection member for electrical connection to an external device, the external connection member housing therein a pin to which leading ends of the coils are connected, and a pin to which trailing ends of the coils are connected. The external connection member may be integrally formed together with the resin part. Therefore, various ends of the coils are kept out of contact with other metal members, thereby solving a conduction failure.

[9] In the first invention, the magnetostrictive torque sensor may further comprise soft magnetic metal members disposed in the vicinity of the coils. Since magnetic fluxes near the coils pass through the soft magnetic metal members, detected values are stabilized.

[10] In the first invention, the soft magnetic metal members may be of a hollow tubular shape. Since the soft magnetic metal members are in the form of tubular rings, the soft magnetic metal members can be mounted directly onto the shaft member.

[11] In the first invention, the soft magnetic metal members may comprise members that are fabricated separately from the shaft member. One or more metal members can be installed with greater freedom in positions where detected values are stabilized, more so than if the metal members were formed integrally with the shaft member.

[12] In the first invention, the soft magnetic metal members may be disposed axially at opposite ends of the coils. Since the soft magnetic metal members are disposed axially at opposite ends of the coils, magnetic fluxes pass only through the soft magnetic metal members, thereby making the detected values stable.

[13] In the first invention, the soft magnetic metal members may each have a slit defined therein. Since eddy currents are not generated in the soft magnetic metal members due to the slits defined therein, magnetic fluxes are not generated in directions that cancel out the magnetic fluxes of the coils. Accordingly, the magnetostrictive torque sensor can detect torque without a reduction in sensitivity.

[14] In the first invention, the housing may have an opening in an axial direction of the shaft member, and the soft magnetic metal members may be disposed in the opening. Inasmuch as magnetic fluxes of the coils, which tend to flow out of the housing, pass through the soft magnetic metal members, the detected values are stabilized.

[15] According to a second invention, there is provided an electrically operated power steering apparatus for applying power of a motor to a steering system of a vehicle to reduce a steering torque, which is generated when a driver of the vehicle turns a steering wheel of the vehicle, the electrically operated power steering apparatus including a steering torque sensor for detecting steering torque, wherein the steering torque sensor comprises a magnetostrictive film disposed on a steering shaft member, and coils for detecting a change in a magnetic property of the magnetostrictive film. A housing houses therein at least the steering shaft member, the magnetostrictive film, and the coils, the housing including a resin part, a tubular part made of metal, and a flange made of metal, the resin part, the tubular part, and the flange being formed together integrally.

Even if an alternating magnetic field is generated by an engine, an electric generator, or an electric vehicle motor in the environment around the electrically operated power steering apparatus, since the alternating magnetic field does not pass through the steering shaft member, noise is not generated, and vibrations are reduced. Consequently, the electrically operated power steering apparatus allows the driver to experience a smooth steering sensation in a quiet and highly responsive manner. The steering torque sensor does not adversely affect other sensors on and around the steering shaft member, such as a steering angle sensor, etc.

With the magnetostrictive torque sensor according to the present invention, as described above, alternating magnetic fluxes do not pass through the shaft member, the magnetostrictive member, or the coils, so that the magnetostrictive torque sensor is less susceptible to alternating magnetic fields. As a result, the magnetostrictive torque sensor is capable of accurately detecting torque.

With the electrically operated power steering apparatus according to the present invention, even if alternating magnetic fields are generated by a peripheral device, since such alternating magnetic fields do not pass through the steering shaft member, noise is not generated and vibrations are reduced. Consequently, the electrically operated power steering apparatus allows the driver to experience a smooth steering sensation in a quiet and highly responsive manner. Also, the steering torque sensor does not adversely affect other sensors on and around the steering shaft member, such as a steering angle sensor, etc.

BRIEF DESCRIPTION OF THE DRAWINGS

FIG. 13 is a characteristic diagram showing changes in detected torque values (detected data) detected by the first torque sensor with respect to a steering torque;

FIG. 14A is a side elevational view, partially omitted from illustration, of a portion of the first torque sensor;

FIG. 14B is a side elevational view, partially omitted from illustration, of a portion of a conventional torque sensor;

DESCRIPTION OF THE EMBODIMENTS

A magnetostrictive torque sensor and an electrically operated power steering apparatus according to an embodiment of the present invention will be described below with reference to FIGS. 1 through 30.

First, an electrically operated power steering apparatus incorporating a magnetostrictive torque sensor according to an embodiment of the present invention will be described below with reference to FIG. 1.

Figure 1:
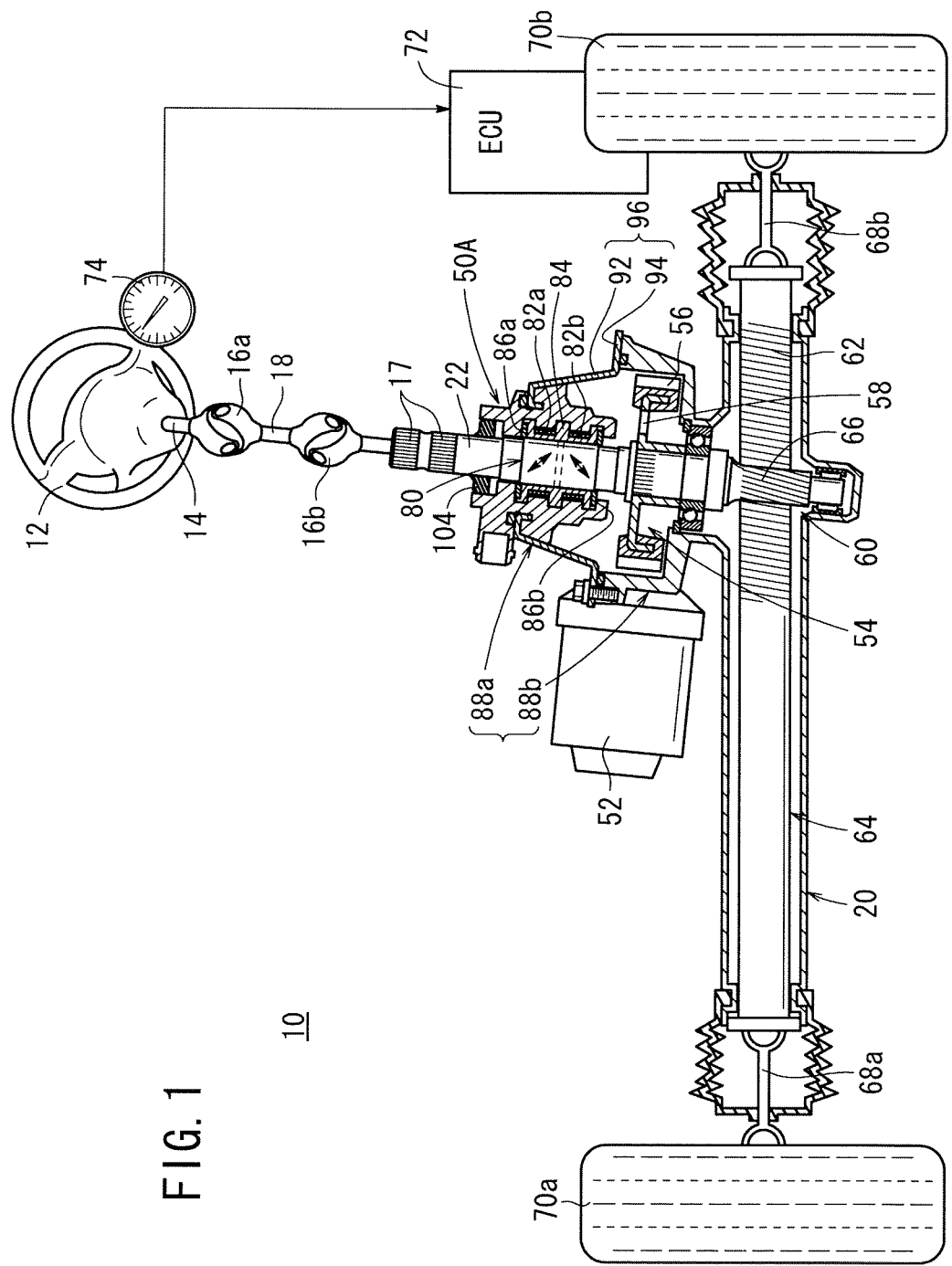
FIG. 1 is a view of an electrically operated power steering apparatus according to an embodiment of the present invention.

As shown in FIG. 1, an electrically operated power steering apparatus 10 is arranged such that a steering torque and a steering angle, which are produced when the driver operates a steering wheel 12, are input through a steering shaft 14, a first universal joint 16a, an intermediate shaft 18, a second universal joint 16b, and joints 17 (e.g., serrations) to a steering shaft member 22 of a steering gearbox 20.

The steering gearbox 20 includes the steering shaft member 22 (shaft member), a magnetostrictive torque sensor (hereinafter referred to as a "first torque sensor 50A") according to a first embodiment, which serves as a steering torque sensor for detecting a steering torque applied by the driver, a motor 52 (e.g., a brushless motor) for assisting a steering action made by the driver, a speed reducer 54 (a worm 56 and a worm wheel 58; see FIG. 2) for boosting rotational torque generated by the motor 52, a rack and pinion gear 60, and a rack shaft 64 having formed thereon a rack gear 62 of the rack and pinion gear 60.

The steering shaft member 22 has one end coupled to the steering wheel 12 by the steering shaft 14, the first universal joint 16a, the intermediate shaft 18, and the second universal joint 16b. The other end of the steering shaft member 22 serves as a pinion gear 66 of the rack and pinion gear 60.

A rotational torque, which is boosted by the speed reducer 54, is converted into an axial thrust on the rack shaft 64 by the pinion gear 66 of the rack and pinion gear 60. The axial thrust is transmitted through tie rods 68a, 68b to left and right tires 70a, 70b. The tires 70a, 70b are thus turned about vertical axes depending on the steering angle of the steering wheel 12, thereby changing the direction of the vehicle.

At this time, a controller 72 (ECU) controls the motor 52 based on signals from a vehicle speed sensor 74, for example, and on the basis of a signal from at least the first torque sensor 50A. In FIG. 1, various wires, e.g., wires between the controller 72 and the first torque sensor 50A and wires between the controller 72 and the motor 52, are omitted from illustration.

The first torque sensor 50A detects a steering torque applied when the driver turns the steering wheel 12, and the controller 72 controls the motor 52 based on signals from the vehicle speed sensor 74, and on the basis of signals from the first torque sensor 50A. At this time, a torque generated by the motor 52 is applied to the pinion gear 66 of the rack and pinion gear 60. Therefore, the torque required to rotate the steering wheel 12 is reduced, thus reducing the burden on the driver to produce the steering torque.

If the steering torque is represented by Ts and a coefficient for an assistive quantity $A_H$ is given as a constant $k_A$, for example, then the assistive quantity $A_H$ is expressed as follows:

$$A_H = k_A \times Ts$$

If a load is considered in terms of a pinion torque Tp±, then the pinion torque Tp is expressed as follows:

$$Tp = Ts + A_H$$

$$= Ts + k_A \times Ts$$

As a result, the steering torque Ts is calculated as follows:

$$Ts = Tp/(1+k_A)$$

Therefore, the steering torque Ts is reduced to $1/(1+k_A)$ of the pinion torque Tp assuming that the steering wheel 12 is not assisted. At this time, $k_A > 0$ or $k_A = 0$.

As the vehicle speed becomes higher, the reactive force applied from the road to the tires is progressively reduced, and hence the response that the driver feels from the steering wheel 12 when the driver turns the steering wheel 12 also is reduced. However, by reducing the constant $k_A$ as a function of vehicle speed as the vehicle speed goes higher, the response from the steering wheel 12 to the driver is prevented from becoming reduced as the vehicle speed becomes higher. At this time, the steering torque Is may be increased to give the driver a greater response.

Figure 2:
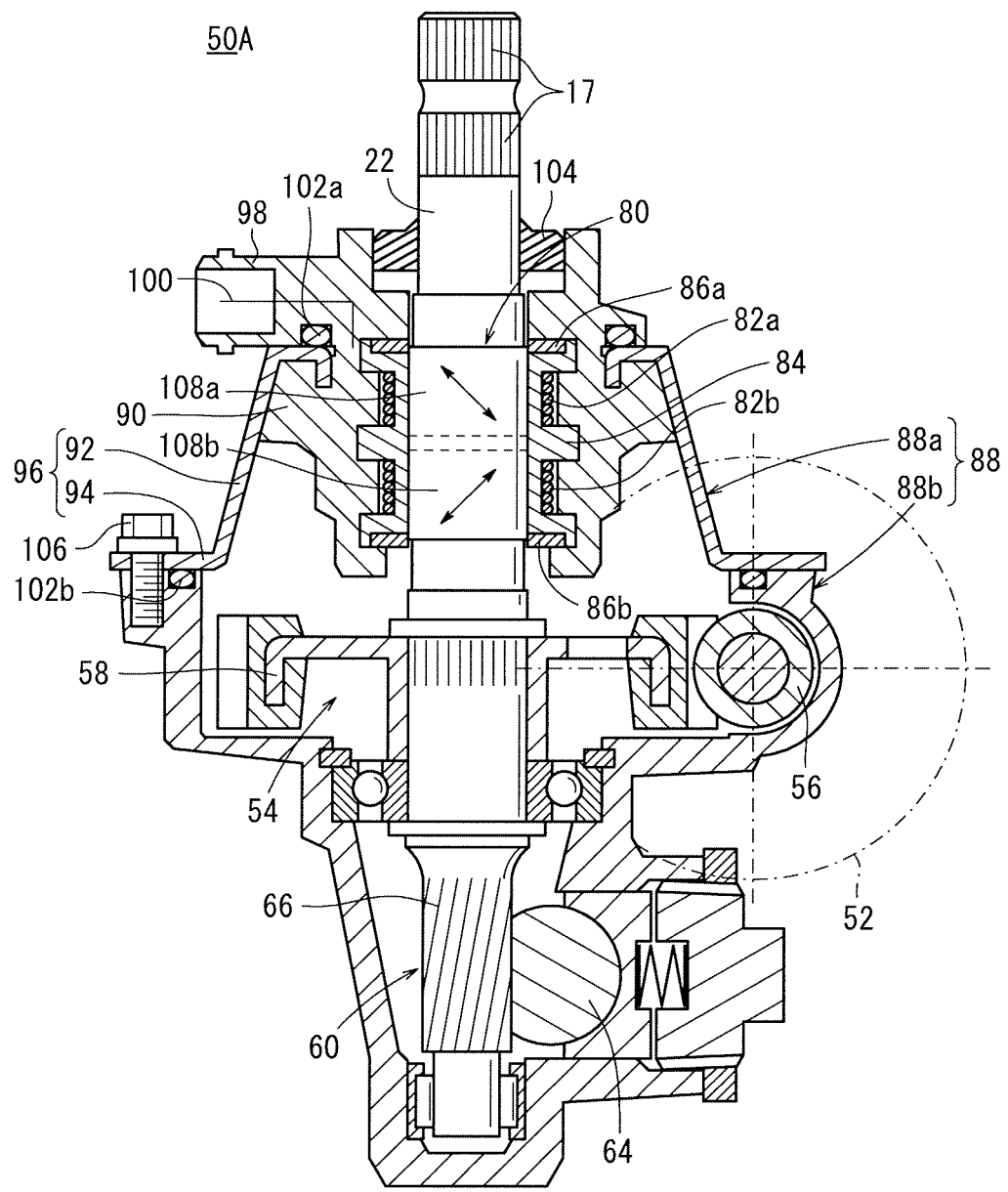
FIG. 2 is a side elevational view showing a first torque sensor partially in cross section.

As shown in FIG. 2, the first torque sensor 50A includes a single magnetostrictive film 80 (magnetostrictive member) disposed on an outer circumferential surface of the steering shaft member 22 with the pinion gear 66 being disposed on the other end thereof, a first coil 82a and a second coil 82b for detecting a change in the magnetic permeability of the magnetostrictive film 80 depending on a torsional torque applied to the steering shaft member 22, a single bobbin 84 supporting the first coil 82a and the second coil 82b thereon, a first disk 86a and a second disk 86b disposed respectively on opposite ends of the bobbin 84, each of which is made of a soft magnetic electric conductor, i.e., a low-carbon iron alloy, and having a slit 85 (see FIG. 8) defined therein, and a housing 88, which accommodates therein at least the steering shaft member 22, the magnetostrictive film 80, the first coil 82a and the second coil 82b, the bobbin 84, and the first disk 86a and the second disk 86b. The steering shaft member 22 is rotatably supported in the housing 88 by a bearing disposed in a central region, and another bearing disposed near the other end of the steering shaft member 22. A magnetic shield back yoke, not shown, is attached to each of the first coil 82a and the second coil 82b.

As shown in FIG. 2, the housing 88 includes a first housing member 88a positioned near one end of the steering shaft member 22, which is located near the steering wheel 12 and disposed in a position housing therein at least the magnetostrictive film 80, the first coil 82a and the second coil 82b, the bobbin 84, and the first disk 86a and the second disk 86b, and a second housing member 88b made of metal, which is positioned near the other end of the steering shaft member 22 and disposed in a position housing at least the speed reducer 54 therein.

The first housing member 88a includes a resin part 90, a tubular part 92 made of a soft magnetic metal, and a flange 94 made of a soft magnetic metal. The resin part 90, the tubular part 92, and the flange 94 are integrally formed with each other. The phrase "integrally formed" refers to an expression covering the meaning "integrally molded".

More specifically, the tubular part 92 is positioned within a region of the first housing member 88a, which houses the first coil 82a and the second coil 82b therein. The flange 94 is positioned at a junction between the first housing member 88a and the second housing member 88b. The resin part 90 is positioned so as to extend from and between the first and second coils 82a, 82b and the tubular part 92, toward one end of the steering shaft member 22. In FIG. 2, the tubular part 92 and the flange 94 are integrally formed from the same soft magnetic metal. In the following description, the integrally formed member, which is made up of the tubular part 92 and the flange 94, will be referred to as a "metal member 96".

The tubular part 92 has an opening near one end of the steering shaft member 22, and an opening near the other end of the steering shaft member 22. The opening near the one end of the steering shaft member 22 is smaller in size than the opening near the other end of the steering shaft member 22. The tubular part 92 is inclined with respect to an axial direction of the steering shaft member 22, as viewed in vertical cross section.

The first housing member 88a has a connector 98 (external connection member) for electrical connection to an external device. The connector 98 houses therein a plurality of pins 100, to which various ends (leading and trailing ends) of the first coil 82a and the second coil 82b are connected (a pin to which the leading end of the first coil 82a is connected, a pin to which the trailing end of the first coil 82a is connected, a pin to which the leading end of the second coil 82b is connected, and a pin to which the trailing end of the second coil 82b is connected). The connector 98 is molded from resin integrally with the resin part 90, and serves as a portion of the resin part 90.

A first o-ring 102a is interposed between the upper surface of the tubular part 92 and the resin part 90. A second o-ring 102b is interposed between the lower surface of the flange 94, which is integral with the tubular part 92 and the second housing member 88b. A sealing member 104 is disposed between an upper portion of the resin part 90 and the steering shaft member 22. The flange 94 and the second housing member 88b are integrally secured to each other by three bolts 106, for example. The first o-ring 102a, the second o-ring 102b, and the sealing member 104 serve to maintain the interior of the first torque sensor 50A and the interior of the steering gearbox 20 (see FIG. 1) in a hermetically sealed condition.

The single magnetostrictive film 80, which is made of a magnetostrictive material of an Fe—Ni alloy (or alternatively, an Fe—Co alloy, a Sm—Fe alloy, or the like) having a thickness in a range from 5 to 100 μm, is deposited on the outer circumferential surface of the steering shaft member 22 near one end thereof by plating (or spraying, sputtering, evaporation, adhesive bonding, or the like). The magnetostrictive film 80 thus is grown highly intimately and to a substantially uniform thickness on the outer circumferential surface of the steering shaft member 22. Where the magnetostrictive film 80 is deposited, the outer circumferential surface of the steering shaft member 22 is cleaned with an alkali, water, or an acid for enabling intimate contact with the magnetostrictive film 80 after the steering shaft member 22 has been machined.

Figure 4:
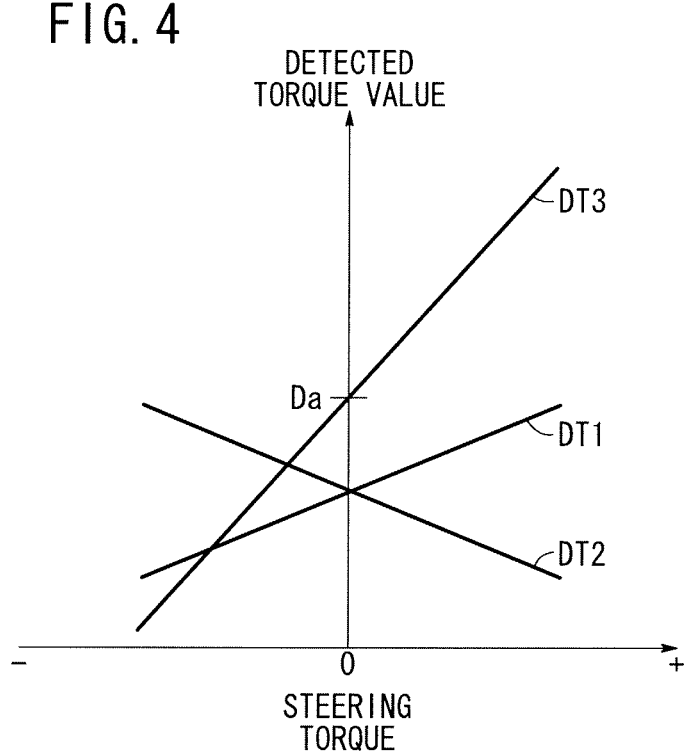
FIG. 4 is a characteristic diagram showing changes in detected torque values (detected data) detected by the first torque sensor with respect to a steering torque.
Figure 5:
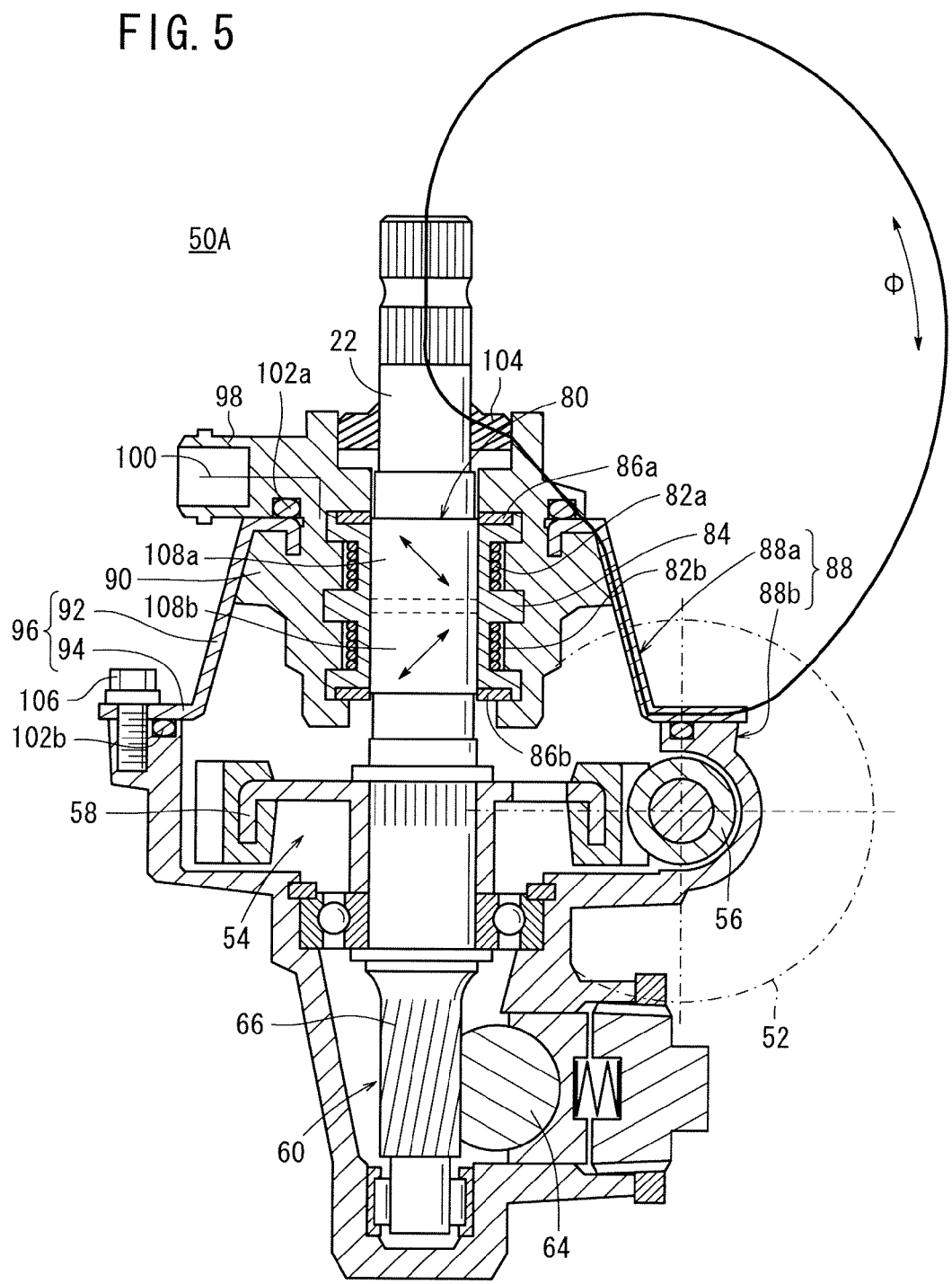
FIG. 5 is a view showing an action of the first torque sensor on alternating magnetic fluxes.

The magnetostrictive film 80 includes a first anisotropic area 108a and a second anisotropic area 108b that differ from each other, i.e., which are opposite to each other, and exhibits characteristics having opposite gradients, as represented by detected data DT1, DT2 in the output characteristic diagram shown in FIG. 4.

The magnetostrictive film 80 becomes anisotropic when it is heated to about 300° C. to 500° C., for example, for several seconds to several hundreds seconds, by a heat treatment process such as a high-frequency induction heating process, while opposite torques in a range from about 5 to 200 Nm (which may be higher or lower as necessary) are applied to the magnetostrictive film 80. At this time, since the magnetostrictive film 80 is relieved of strains due to the opposite torques applied from the steering shaft member 22 to the magnetostrictive film 80, no stresses subsequently will be applied to the magnetostrictive film 80. Then, the magnetostrictive film 80 is cooled to normal room temperature. The magnetostrictive film 80 is relieved of strains caused by heating due to creep developed in the magnetostrictive film 80 by such heating. When the applied torques are removed, the first anisotropic area 108a and the second anisotropic area 108b, which are opposite to each other, are produced in the magnetostrictive film 80.

Figure 3:
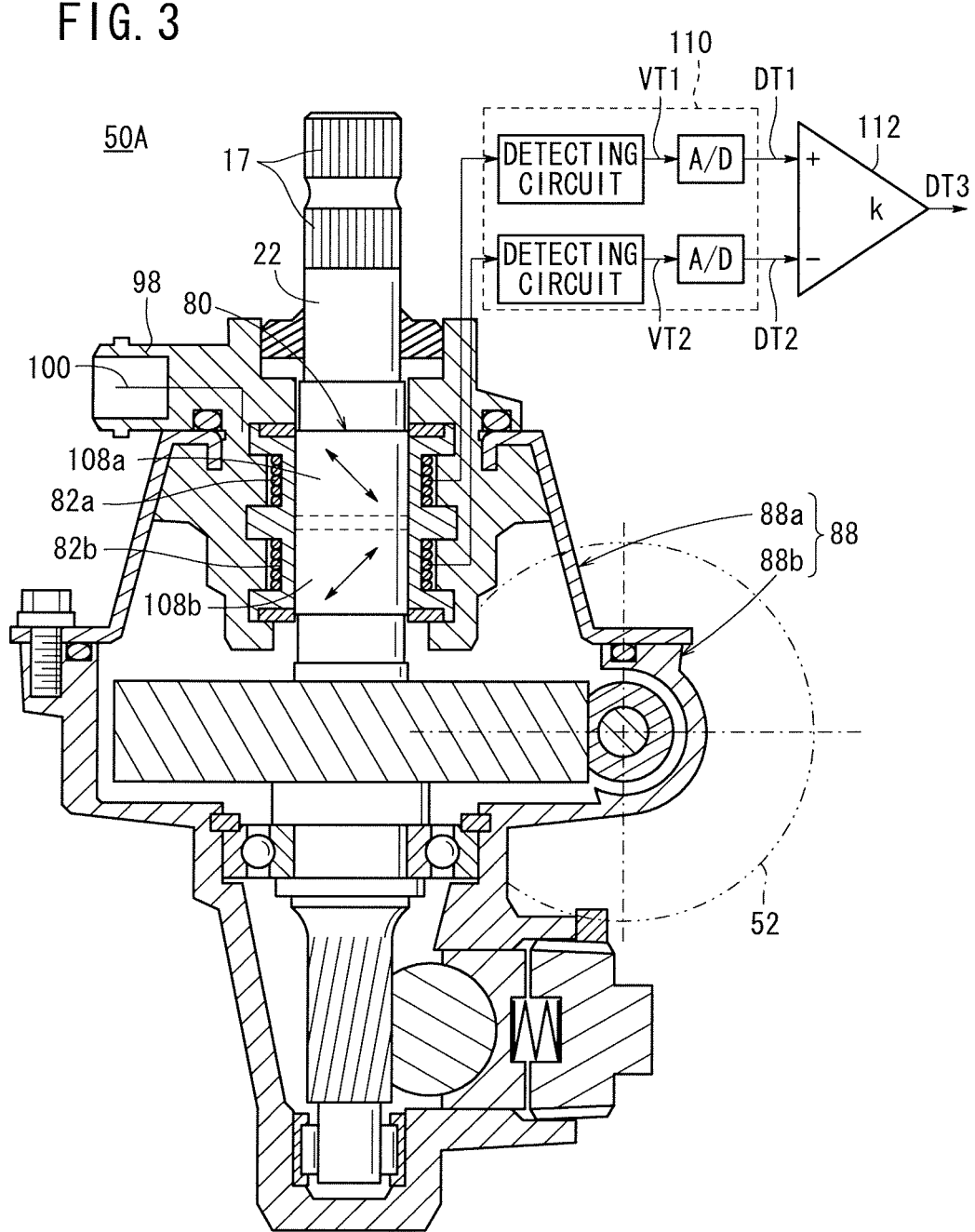
FIG. 3 is a view illustrative of an example of a signal processing sequence of the first torque sensor.

Various ends of the first coil 82a and the second coil 82b are connected to corresponding ones of the pins 100 of the connector 98. The first coil 82a and the second coil 82b are energized with AC electric power by the controller 72 through the connector 98. When the first coil 82a and the second coil 82b are energized with AC electric power in this manner, changes caused by an applied steering torque in magnetic permeabilities of the first anisotropic area 108a and the second anisotropic area 108b of the magnetostrictive film 80 are detected respectively as impedance changes. As shown in FIG. 3, such impedance changes are converted respectively into a first detected voltage VT1 and a second detected voltage VT2 by detecting circuits of an interface section 110. The first detected voltage VT1 and the second detected voltage VT2 then are converted into digital first detected data DT1 and digital second detected data DT2 by A/D converters of the interface section 110. The interface section 110 may be included within the controller 72 or the housing 88.

Changes in magnetic permeabilities, i.e., the first detected data DT1 and the second detected data DT2, then are supplied from the interface section 110 to an arithmetic unit 112 in the controller 72, which produces digital data (detected torque data DT3) having output characteristics as shown in FIG. 4, in accordance with the following equation:

$$DT3 = k \cdot (DT1 - DT2) + Da \text{ (where } k \text{ is a proportionality constant)}$$

Based on the produced detected torque data DT3, the controller 72 controls the motor 52 as described above.

As described above, the resin part 90 of the first torque sensor 50A houses therein the bobbin 84 having the first coil 82a and the second coil 82b wound therearound, and which is molded of resin integrally with the connector 98. The connector 98 houses the pins 100 to which the various ends of the first coil 82a and the second coil 82b are connected. Therefore, the various ends of the first coil 82a and the second coil 82b are kept out of contact with other metal members, thereby solving a conduction failure.

Furthermore, even if an electromagnetic device, such as an electric generator, a fuel injector solenoid, an electric motor, or the like disposed in a gasoline automobile or a motor-powered electric automobile, is disposed around the first torque sensor 50A, alternating magnetic fluxes φ pass through the metal part of the housing 88, i.e., the metal member 96 (the tubular part 92 and the flange 94), which are made of an iron alloy, and the one end of the steering shaft member 22, but not through the magnetostrictive film 80, the first coil 82a, or the second coil 82b. Therefore, a problem caused by noise added to the detected signals representative of the first detected voltage VT1, the second detected voltage VT2, etc., can be solved.

As described above, the metal member 96 includes the tubular part 92, which has a gradient as viewed in vertical cross section, and the flange 94. The gradient of the tubular part 92 is used to collect and guide alternating magnetic fluxes φ toward the distal end of the steering shaft member 22 (toward the second universal joint 16b). Consequently, such alternating magnetic fluxes φ are less likely to pass through the axial central portion of the steering shaft member 22, the magnetostrictive film 80, the first coil 82a, or the second coil 82b, so that the first torque sensor 50A is less susceptible to alternating magnetic fluxes φ.

When the first torque sensor 50A is incorporated in the electrically operated power steering apparatus 10, noise-induced vibrations are not transmitted from the motor 52, which assists the driver in turning the steering wheel 12, so that the driver can experience a smooth steering sensation.

According to the background art, noise is removed by a low-pass filter. Since the first torque sensor 50A does not require a low-pass filter, the first torque sensor 50A is free of any delay caused by such a low-pass filter. Therefore, the first torque sensor 50A increases the response of various signals representative of the first detected voltage VT1, the second detected voltage VT2, etc., generates an output signal (detected torque data DT3) exhibiting a wide dynamic range, and allows the driver to experience a smooth steering sensation, which is free of delay in the assistance provided by the motor 52.

The first torque sensor 50A also is advantageous in that the first torque sensor 50A does not magnetically adversely affect other sensors on and around the steering shaft member 22, such as a steering angle sensor, etc.

A process of manufacturing the first torque sensor 50A, and in particular, a process of manufacturing the first housing member 88a, will be described below by way of example with reference to FIGS. 6A through 7B.

Figure 6A:
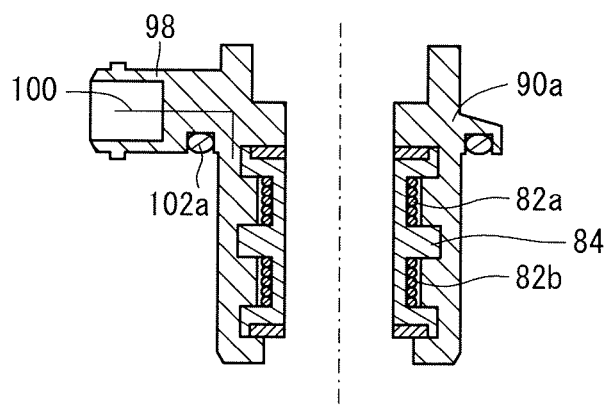
FIG. 6A is a view showing a process stage in which a first resin part is fabricated in a resin molding process.

First, as shown in FIG. 6A, the bobbin 84 with the first coil 82a and the second coil 82b wound therearound, and the pins 100 to which various ends of the first coil 82a and the second coil 82b are connected are molded of resin, thereby producing a first resin part 90a including the connector 98 integrally molded of resin.

Figure 6B:
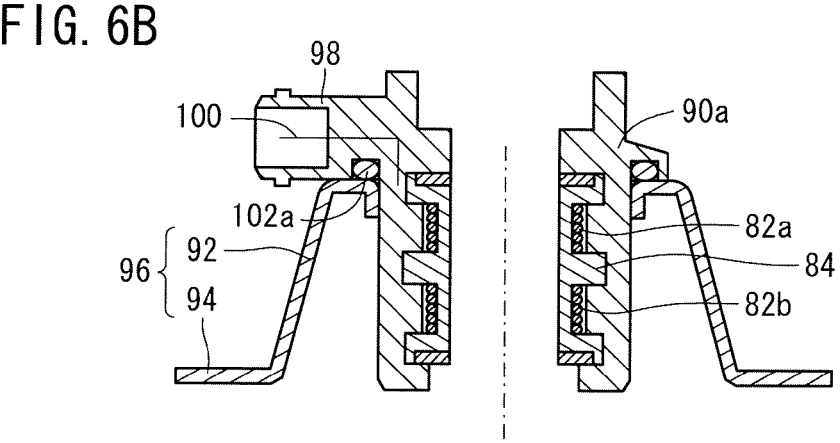
FIG. 6B is a view showing a process stage in which the first resin part and a metal member are combined with each other.

Thereafter, as shown in FIG. 6B, the metal member 96 made up of the tubular part 92 and the flange 94, which are formed integrally of the same soft magnetic metal, is prepared. Then, the first resin part 90a and the metal member 96 are assembled together with the first o-ring 102a interposed therebetween.

Figure 6C:
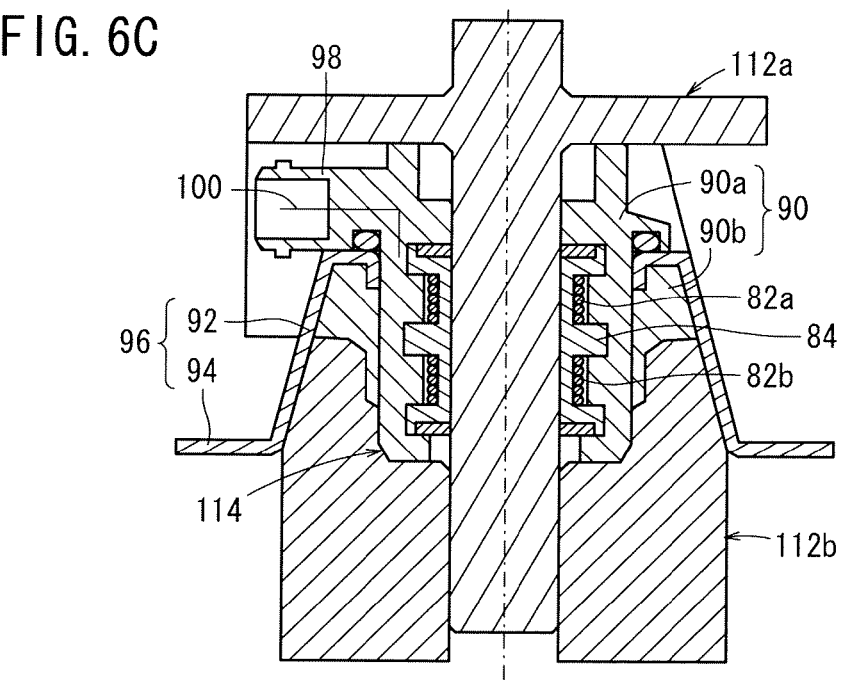
FIG. 6C is a view showing a process stage in which a resin-molded member including the first resin part, the metal member, and a second resin part is fabricated in a resin molding process by a molding die.

Thereafter, as shown in FIG. 6C, the first resin part 90a and the metal member 96, which are assembled together, are placed inside mold members 112a, 112b, and resin is introduced between the tubular part 92 and the first resin part 90a, thereby forming a second resin part 90b. At this time, a resin-molded member 114 is produced, in which the first resin part 90a and the second resin part 90b are integrated into the resin part 90, and at least the first coil 82a, the second coil 82b, the bobbin 84, the tubular part 92, and the flange 94 are encased within the molded resin together with the connector 98, which is formed integrally therewith.

Figure 7A:
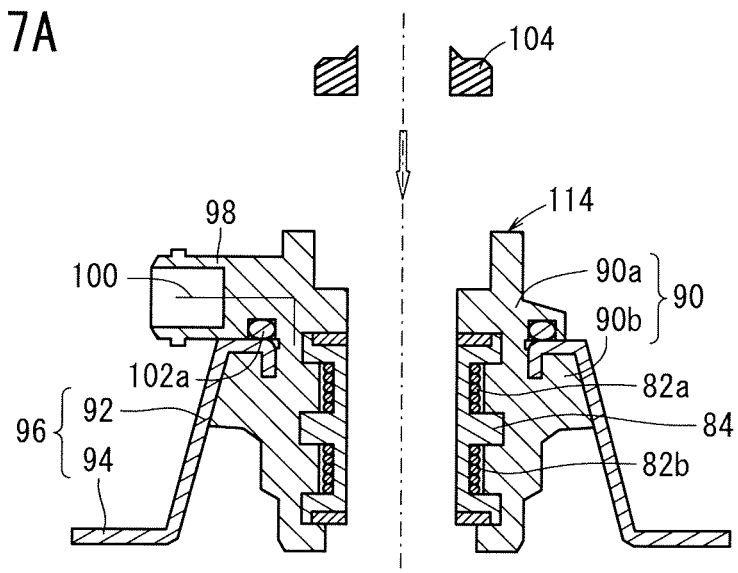
FIG. 7A is a view showing a process stage in which the resin-molded member is separated from the molding die.
Figure 7B:
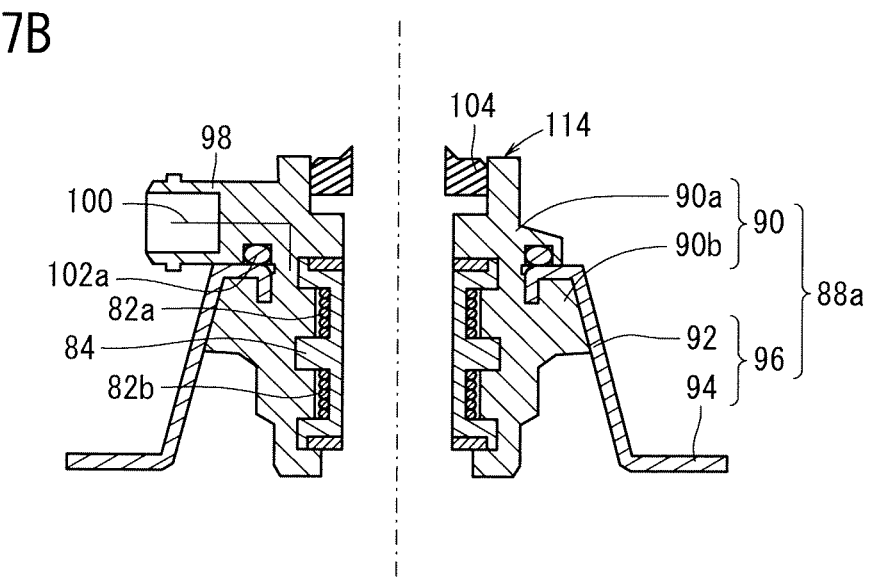
FIG. 7B is a view showing a process stage in which a first housing is fabricated by inserting a seal member into an upper portion of the resin-molded member.

Then, as shown in FIG. 7A, the resin-molded member 114 is removed from the mold members 112a, 112b. Thereafter, as shown in FIG. 7B, the sealing member 104 is inserted into an upper portion of the resin-molded member 114, thereby completing the first housing member 88a.

According to the above manufacturing process, the first housing member 88a, including the resin part 90, the tubular part 92 made of a soft magnetic metal, and the flange 94 made of a soft magnetic metal, can be manufactured easily, with the resin part 90, the tubular part 92, and the flange 94 being formed together integrally.

Operations and advantages of the first disk 86a and the second disk 86b, each having a slit 85 defined therein, will be described below with reference to FIGS. 8 through 13.

First, the behavior of a torque sensor, which is free of the first disk 86a and the second disk 86b, will be described below with reference to FIGS. 9 and 10.

Figure 9:
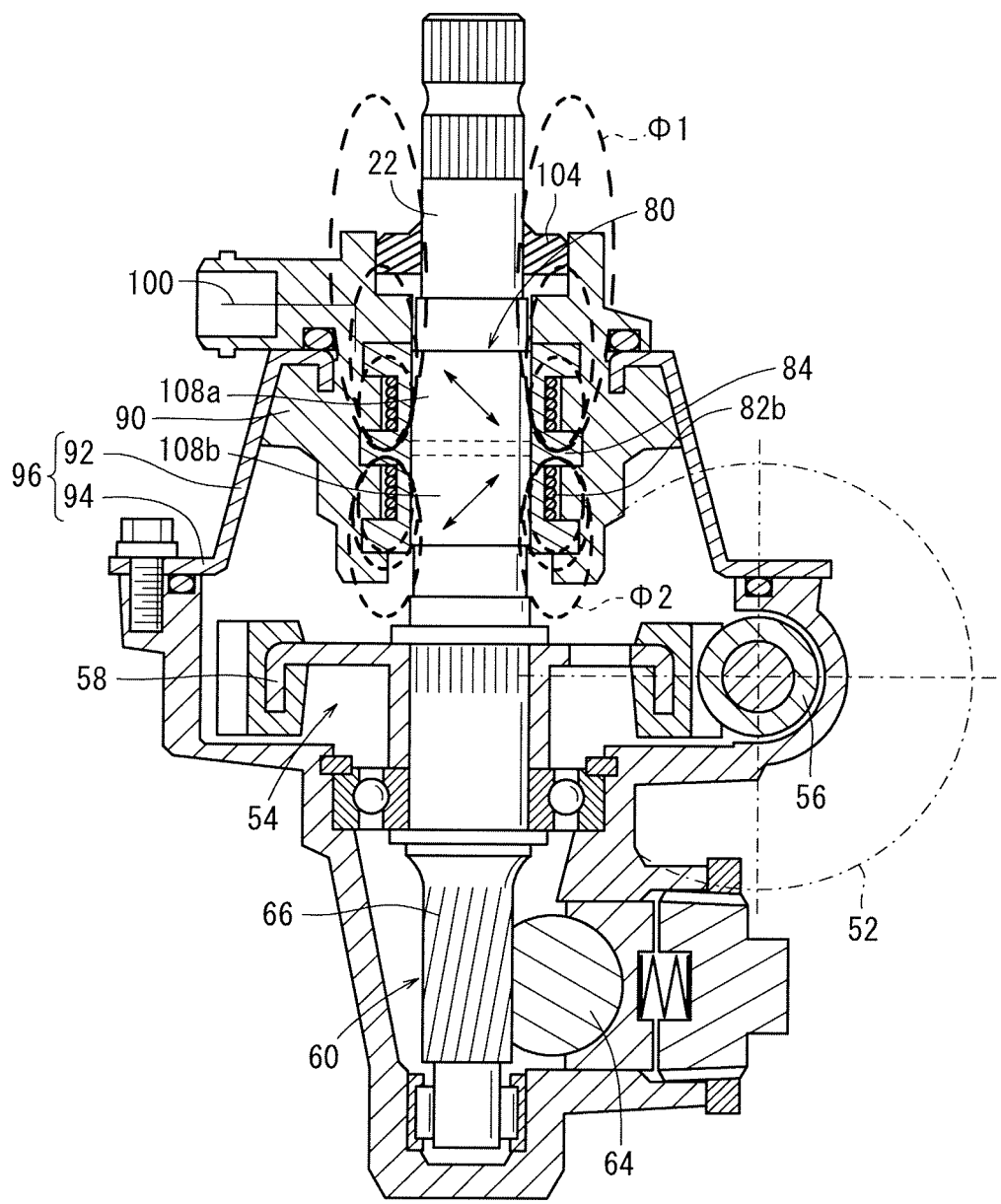
FIG. 9 is a view showing a structure free of the first disk and the second disk, together with magnetic paths of alternating magnetic fluxes from a first coil and a second coil.
Figure 10:
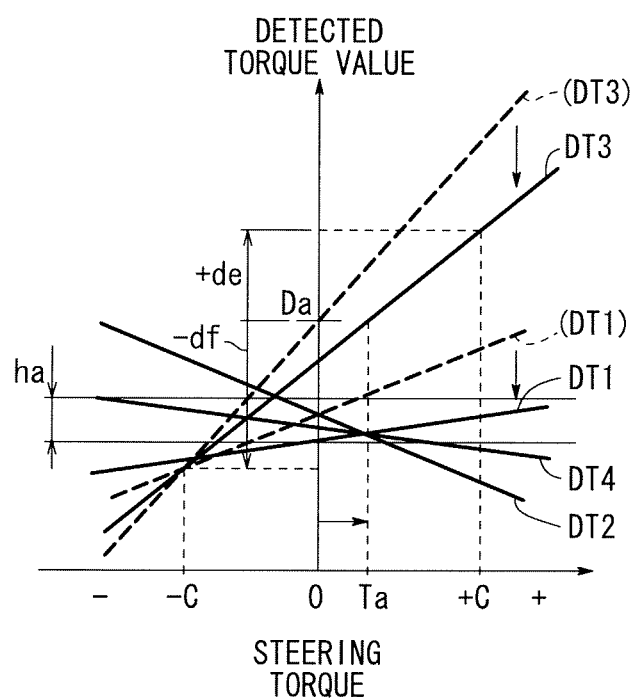
FIG. 10 is a characteristic diagram showing an effect that alternating magnetic fluxes from the first coil and the second coil have on detected torque values (detected data)

As shown in FIG. 9, alternating magnetic fluxes around the first coil 82a (magnetic fluxes $\phi 1$ of the first coil 82a) and alternating magnetic fluxes around the second coil 82b (magnetic fluxes $\phi 2$ of the second coil 82b) have paths of different lengths (not symmetric), and outputs detected by the first coil 82a and the second coil 82b are different from each other. Therefore, the magnitude of the first detected data DT1 is different from a designed value. As shown in FIG. 10, for example, a central torque value (a torque value where the first detected data DT1 and the second detected data DT2 agree with each other) is shifted by Ta from a reference value (torque value=zero). Hence, the calculated detected torque data DT3 have a gradient and a central torque value, which are shifted largely from their designed values. As a result, a problem arises in that magnitudes of detected clockwise (+) and counterclockwise (−) torques are different from each other. More specifically, when a steering torque +c is applied, the output is of a value shifted by +de from a reference value Da, and when a steering torque −c is applied, the output is of a value shifted by −df from the reference value Da, resulting in a lack of symmetry. Such a lack of symmetry tends to impair the steering sensation provided by the electrically operated power steering apparatus.

In addition, even if the torque sensor is not actually broken down, a diagnostic decision value DT4 determined from DT1+DT2 is likely to fall outside of a safety range ha, so that the torque sensor may be judged as malfunctioning, and assistance provided by the motor 52 may be stopped.

Magnetic fluxes $\phi 1$ of the first coil 82a are magnetically affected by the iron alloy of the first universal joint 16a, the second universal joint 16b, and the intermediate shaft 18, which are disposed between the steering shaft member 22 and the steering wheel 12, and the steering shaft 14.

After the steering gearbox alone has been assembled and adjusted in the factory, and then installed in an automobile, the first universal joint 16a, the intermediate shaft 18, the second universal joint 16b, and the steering shaft 14 are installed in position. The magnetic fluxes $\phi 1$ of the first coil 82a then pass up to the steering shaft 14, along a path that differs greatly from the path of the magnetic fluxes $\phi 2$ of the second coil 82b. Even though the steering gearbox alone is assembled and adjusted in the factory, values of the detected torques are shifted when the steering gearbox is installed in an automobile.

The magnetic fluxes $\phi 1$ and the magnetic fluxes $\phi 2$ may also possibly adversely affect other sensors on and around the steering shaft member 22, such as the steering angle sensor, etc.

Figure 11A:
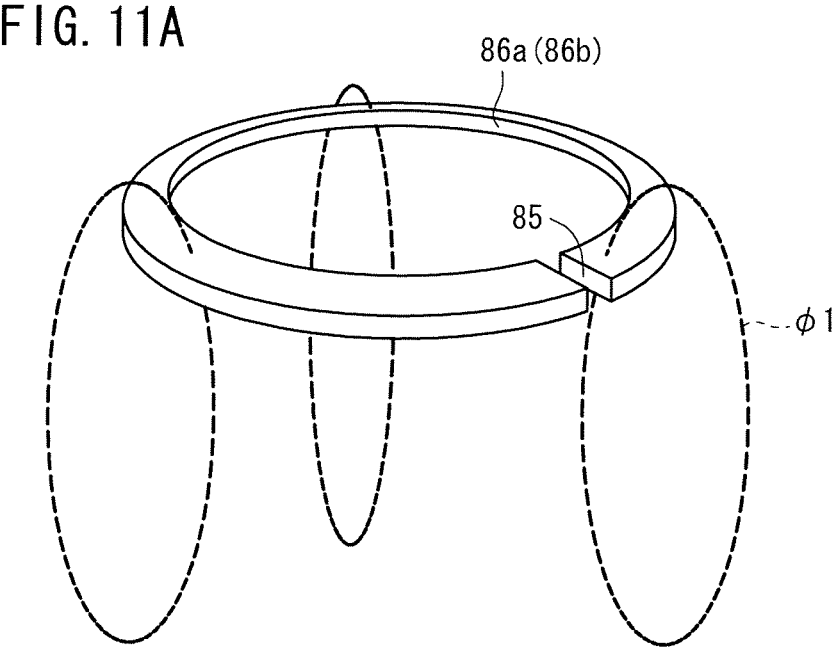
FIG. 11A is a view showing an action of the first disk and the second disk.

On the other hand, the first torque sensor 50A includes the first disk 86a and the second disk 86b. Since the first disk 86a and the second disk 86b are made of a low-carbon iron alloy, which is a soft magnetic material, when the first coil is energized with AC electrical power from the controller 72, as shown in FIG. 11A, the first disk 86a and the second disk 86b allow the magnetic fluxes $\phi 1$, for example, to pass therethrough, but do not become magnetized themselves. Therefore, alternating magnetic fluxes around the first coil 82a (the magnetic fluxes $\phi 1$ of the first coil 82a) pass through a path that extends through the first disk 86a, and the alternating magnetic fluxes around the second coil 82b (the magnetic fluxes $\phi 2$ of the second coil 82b) pass through a path that extends through the second coil 82b. The paths define respectively symmetric magnetic paths.

Figure 8:
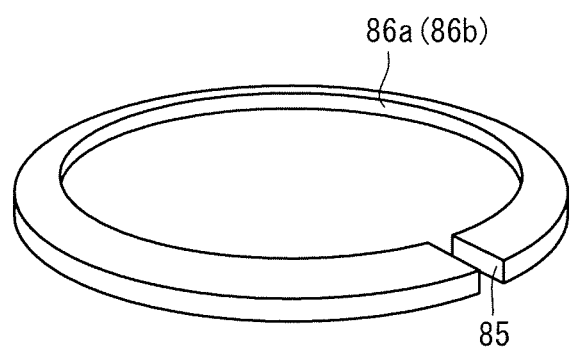
FIG. 8 is a perspective view of a first disk and a second disk.
Figure 11B:
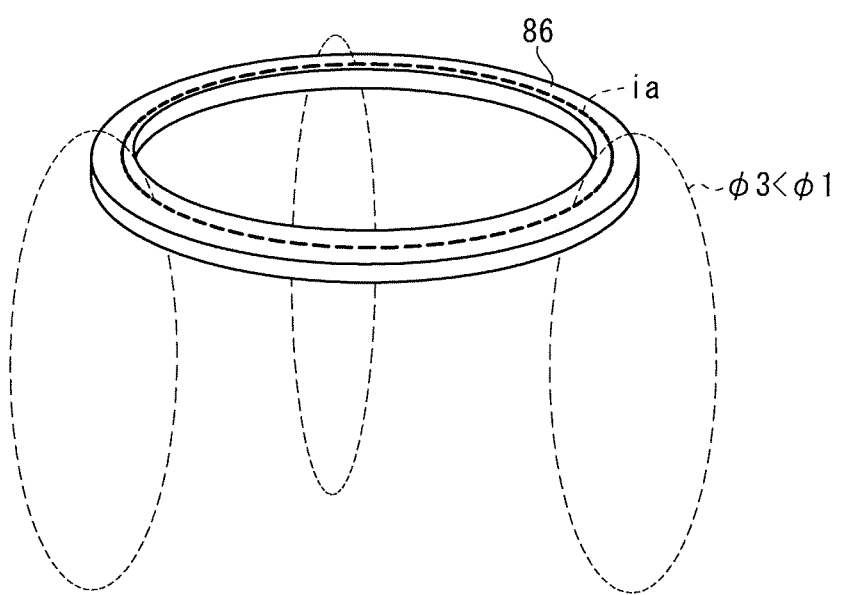
FIG. 11B is a view showing an action of a disk that is free of a slit.
Figure 12:
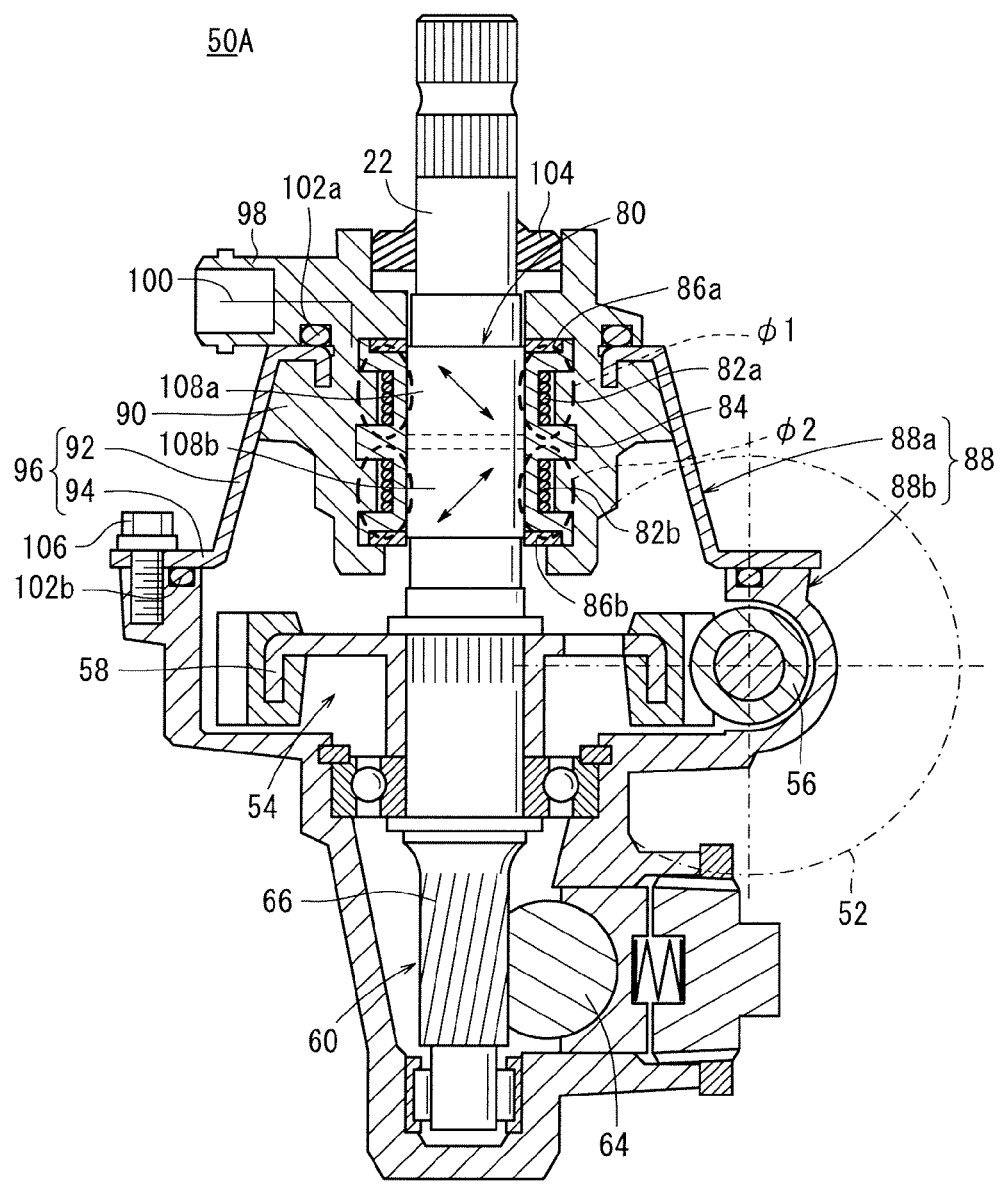
FIG. 12 is a view of the first torque sensor incorporating the first disk and the second disk, together with magnetic paths of alternating magnetic fluxes from the first coil and the second coil.

Operation of the slit 85 shown in FIG. 8 will be described below. FIG. 11B shows a disk 86, which is free of the slit 85. When magnetic fluxes $\phi 1$ pass through the disk 86, the magnetic fluxes $\phi 1$ generate an eddy current is in the disk 86, which in turn generates magnetic fluxes in a direction that cancels the magnetic fluxes $\phi 1$, thus generating magnetic fluxes $\phi 3$ that are smaller than the magnetic fluxes $\phi 1$ ($\phi 3 > \phi 1$) going around the first coil 82a. In other words, without the slit 85, large magnetic fluxes cannot flow through the disk, resulting in a reduction in sensitivity and stability.

According to the present embodiment, as shown in FIG. 11A, the first disk 86a and the second disk 86b each have a slit 85 defined therein. Since eddy currents are not generated in the disks, large magnetic fluxes can flow through the disks, resulting in an increase in sensitivity and stability. Furthermore, as shown in FIG. 1, since the magnetic path of the magnetic fluxes $\phi 1$ and the magnetic path of the magnetic fluxes $\phi 2$ are symmetric, the central value of the steering torque (the detected value when the steering torque is zero) is prevented from differing between the first anisotropic area 108a and the second anisotropic area 108b, even in the presence of the first universal joint 16a, the intermediate shaft 18, the second universal joint 16b, and the steering shaft 14.

Accordingly, as shown in FIG. 13, a stable first detected voltage VT1 and a stable second detected voltage VT2 are obtained. As a result, the detected and calculated torque data DT3 are stabilized. In addition, the gradient of the first detected voltage VT1 and the second detected voltage VT2, which are mutually symmetric, can be increased to thereby increase the sensitivity of the detected and calculated torque data DT3.

Furthermore, as shown in FIG. 13, inasmuch as the diagnostic decision value DT4, which is determined by adding the first detected voltage VT1 and the second detected voltage VT2, does not fall outside of the safety range ha, the first torque sensor 50A will not be mistakenly judged as malfunctioning.

After the steering gearbox 20 has been assembled and adjusted in the factory, the steering gearbox 20 is installed in an automobile, and thereafter, the first universal joint 16a, the intermediate shaft 18, the second universal joint 16b, and the steering shaft 14 are installed in position. Since the alternating magnetic fluxes $\phi 1$ of the first coil 82a and the alternating magnetic fluxes $\phi 2$ of the second coil 82b pass through respective symmetric paths, a stable output is produced from the first torque sensor 50A.

The magnetic path for the alternating magnetic fluxes $\phi 1$ is of a narrow range, which extends around the first coil 82a and passes through the first disk 86a, whereas the magnetic path for the alternating magnetic fluxes $\phi 2$ is of a narrow range, which extends around the second coil 82b and passes through the second disk 86b. Consequently, the alternating magnetic fluxes $\phi 1$ and the alternating magnetic fluxes $\phi 2$ do not adversely affect other sensors on or around the steering shaft member 22, such as a steering angle sensor, etc.

If a reduction in sensitivity and stability is not greatly required, then no slit 85 may be defined in the first disk 86a and the second disk 86b.

In the above embodiment, the first disk 86a and the second disk 86b are disposed on opposite ends of the bobbin 84. However, the first disk 86a and the second disk 86b may be disposed in vertically symmetrical positions on the steering shaft member 22 with respect to the axial center of the magnetostrictive film 80. For example, the first disk 86a may be disposed on a portion of the steering shaft member 22, which is held against the upper end face of the bobbin 84, and the second disk 86b may be disposed on another portion of the steering shaft member 22, which is held against the lower end face of the bobbin 84. Alternatively, the first disk 86a and the second disk 86b may be disposed in vertically symmetrical positions on the first housing member 88a with respect to the axial center of the magnetostrictive film 80. Further alternatively, the first disk 86a may be disposed in the vicinity of the upper opening of the first housing member 88a, whereas the second disk 86b may be disposed in the vicinity of the lower opening of the first housing member 88a. In this case, since the alternating magnetic fluxes $\phi 1$ of the first coil 82a, which tend to flow out of the first housing member 88a, pass through the first disk 86a, and the alternating magnetic fluxes $\phi 2$ of the second coil 82b, which tend to flow out of the first housing member 88a, pass through the second disk 86b, the detected values are stabilized, thereby making it possible to detect torque more accurately. In addition, the other sensors are not adversely affected.

Furthermore, since the first disk 86a and the second disk 86b are of a hollow tubular shape, the first disk 86a and the second disk 86b may be mounted directly on the steering shaft member 22, or may be disposed on the bobbin 84 with the first coil 82a and the second coil 82b wound therearound. The first disk 86a and the second disk 86b can thus be installed in locations with a high degree of freedom, and do not need to be adjusted. Consequently, the first torque sensor 50A can easily be fabricated and can be reduced in size.

Since the first disk 86a and the second disk 86b are in the form of members which are fabricated separately from the steering shaft member 22, the first disk 86a and the second disk 86b can be installed more freely in positions where the detected values are stable, than if the first disk 86a and the second disk 86b were integrally formed together with the steering shaft member 22. Consequently, the first torque sensor 50A can easily be fabricated.

The magnetostrictive film 80, which includes the first anisotropic area 108a and the second anisotropic area 108b that are opposite to each other, will be described below with reference to FIGS. 14A through 18.

As shown in FIG. 14A, the first torque sensor 50A includes the single magnetostrictive film 80 disposed on the steering shaft member 22. The magnetostrictive film 80 has the first anisotropic area 108a and the second anisotropic area 108b, which differ from each other, i.e., which are opposite to each other, and exhibits characteristics having opposite gradients, as represented by the detected data DT1, DT2 in the output characteristic diagram shown in FIG. 4. A first back yoke 150a and a second back yoke 150b for use as magnetic shields are mounted respectively on the first coil 82a and the second coil 82b of the first torque sensor 50A.

As shown in FIG. 14B, a conventional magnetostrictive torque sensor 208 includes two magnetostrictive films (a first magnetostrictive film 244a and a second magnetostrictive film 244b), which are deposited on the surface of a steering rod 202 in respective upper and lower positions by an Ni—Fe plating process. The first magnetostrictive film 244a and the second magnetostrictive film 244b are magnetically anisotropic in opposite directions, and have respective axial widths. A first back yoke 250a and a second back yoke 250b for use as magnetic shields are mounted respectively on a first coil 246a and a second coil 246b.

Figure 15:
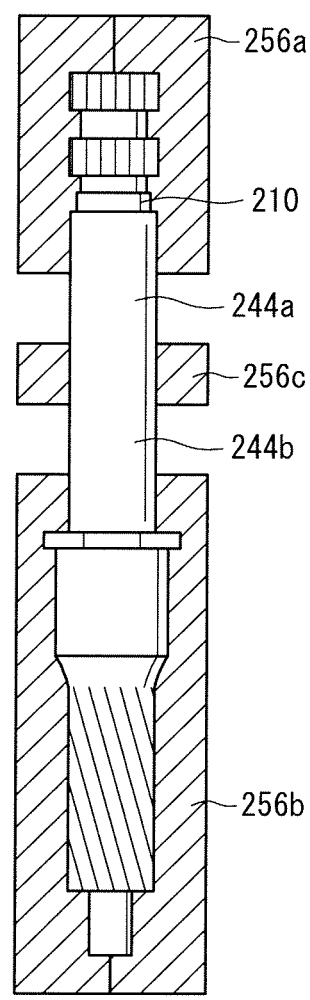
FIG. 15 is a view showing a process stage in which magnetostrictive films are formed by masking a steering shaft in the conventional torque sensor.
Figure 16A:
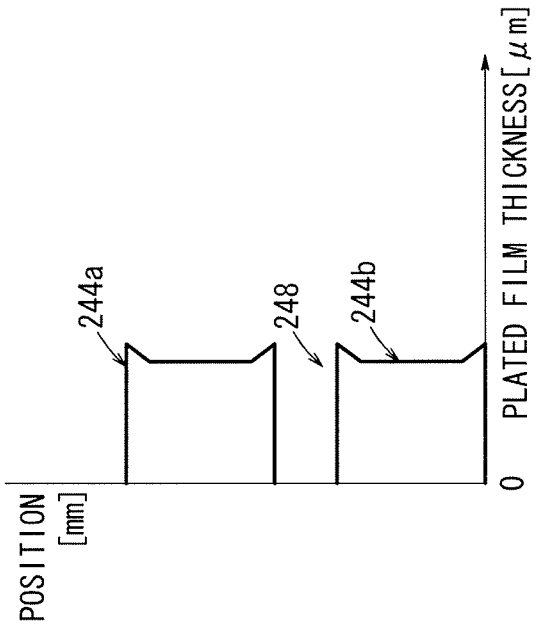
FIG. 16A is a characteristic diagram showing axial variations of current densities on surfaces of plated films, in a process of forming a first magnetostrictive film and a second magnetostrictive film by plating.
Figure 16B:
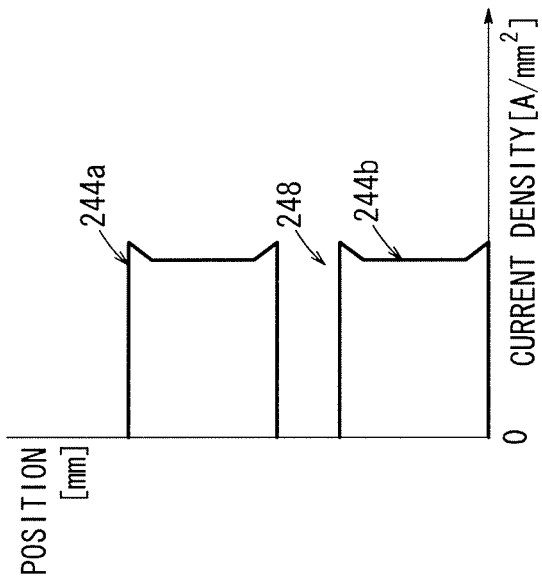
FIG. 16B is a characteristic diagram showing axial variations of thicknesses of the first magnetostrictive film and the second magnetostrictive film.
Figure 17:
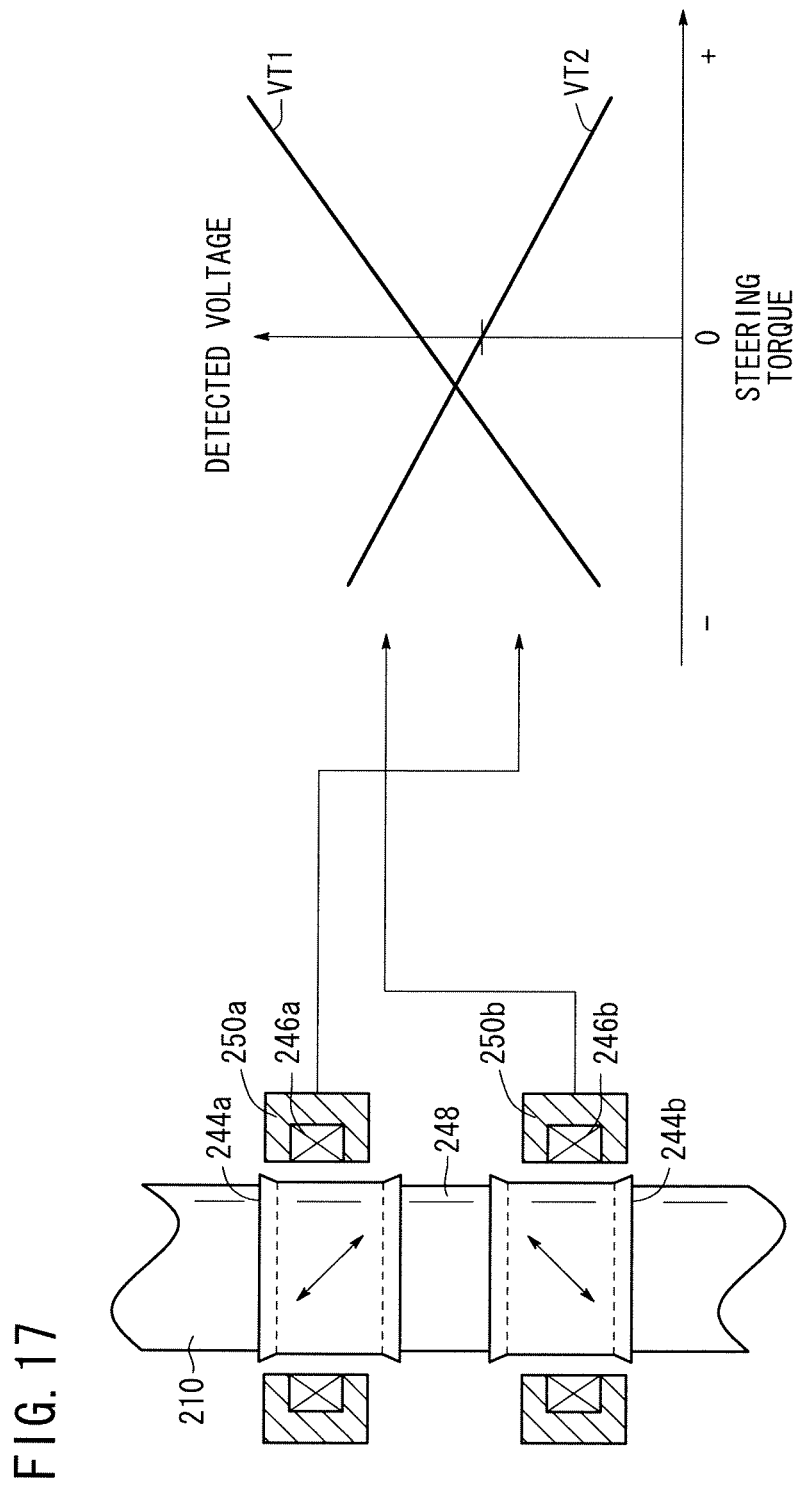
FIG. 17 is a view showing output characteristics of the first coil and the second coil, if the first coil and the second coil face toward portions of the first magnetostrictive film and the second magnetostrictive film where film thicknesses thereof are not uniform.

More specifically, for depositing the first magnetostrictive film 244a and the second magnetostrictive film 244b according to an Ni—Fe plating process, as shown in FIG. 15, the steering rod 210 is masked by first through third masks 256a through 256c, and immersed in a plating bath. Then, the steering rod 210 is electroplated to deposit the first magnetostrictive film 244a and the second magnetostrictive film 244b on the steering rod 210. Since electric field lines are concentrated at boundaries between the steering rod 210, which is an electric conductor, and the first through third masks 256a through 256c, current densities are high at axially upper and lower ends of exposed regions of the steering rod 210 (where the first magnetostrictive film 244a and the second magnetostrictive film 244b are formed), as shown in FIG. 16A, with the result that the first magnetostrictive film 244a and the second magnetostrictive film 244b are locally thicker at axial upper and lower ends thereof, resulting in portions having irregular film thicknesses, as shown in FIG. 16B. As shown in FIG. 17, if the first coil 246a and the second coil 246b face such portions having irregular film thickness, then output characteristics (the detected signal VT1 from the first coil 246a and the detected signal VT2 from the second coil 246b) tend to vary, thereby causing the voltage (midpoint voltage) and gain when the steering torque is zero to differ between the first magnetostrictive film 244a and the second magnetostrictive film 244b, or causing the voltage (midpoint voltage) and gain to differ from those generated when the first coil 246a and the second coil 246b do not face portions having irregular film thickness.

Figure 18:
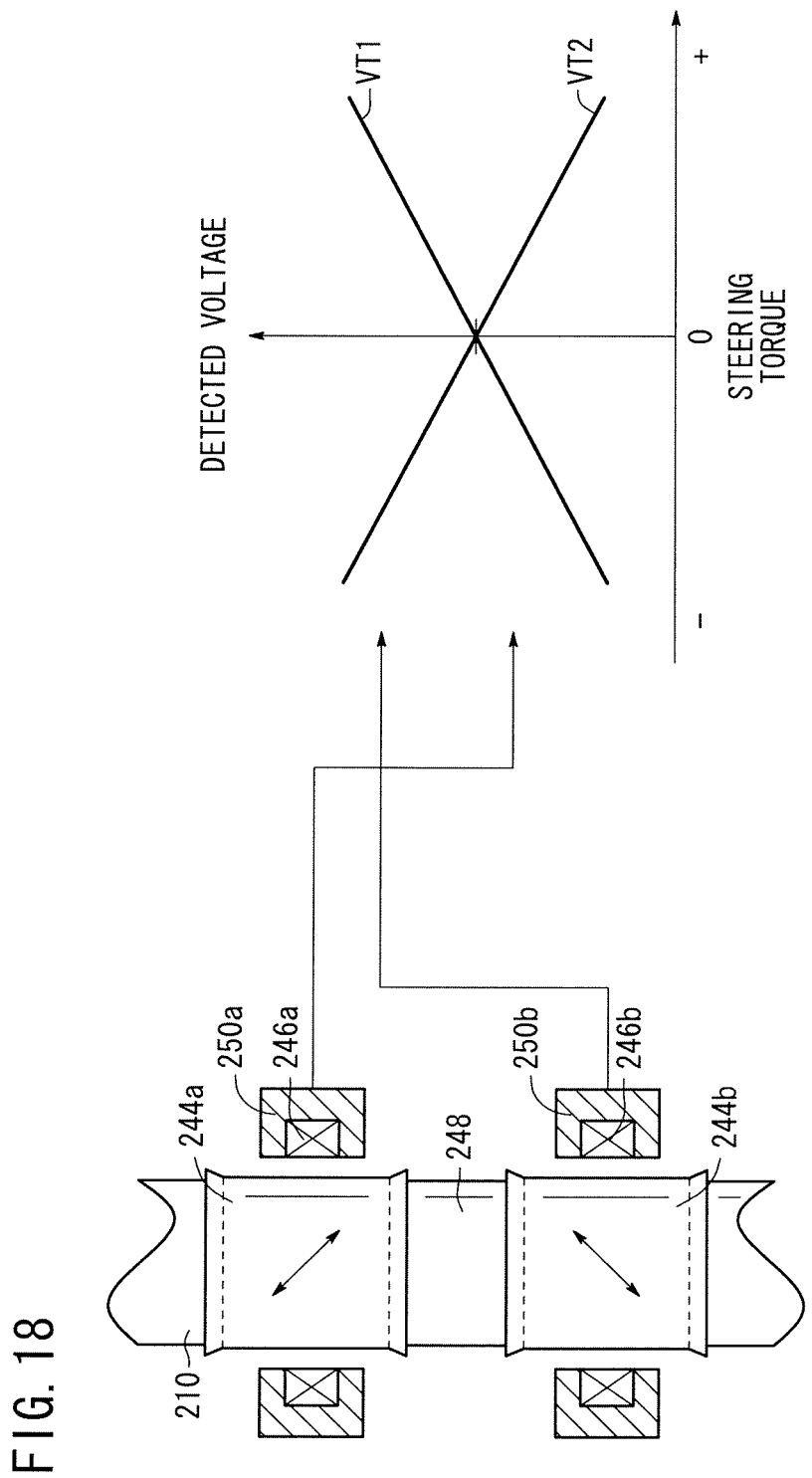
FIG. 18 is a view showing output characteristics of the first coil and the second coil, if the first coil and the second coil face toward portions of the first magnetostrictive film and the second magnetostrictive film where film thicknesses thereof are uniform.

In order to avoid the above drawback, it has heretofore been customary, as shown in FIG. 18, to make the axial dimensions of the first magnetostrictive film 244a and the second magnetostrictive film 244b greater than those of the first coil 246a and the second coil 246b, and to position the first coil 246a and the second coil 246b to face toward constant-thickness central portions of the first magnetostrictive film 244a and the second magnetostrictive film 244b, to thereby obtain the same midpoint voltage and gain at the first magnetostrictive film 244a and the second magnetostrictive film 244b. There are four portions of irregular film thickness, e.g., two upper and lower portions of the first magnetostrictive film 244a, and two upper and lower portions of the second magnetostrictive film 244b. In order to place the first coil 246a and the second coil 246b out of alignment with the four portions having irregular film thickness, it is necessary to increase the axial lengths of the first magnetostrictive film 244a and the second magnetostrictive film 244b. In addition, because of the third mask 256c, a gap 248 between the first magnetostrictive film 244a and the second magnetostrictive film 244b cannot be reduced. Accordingly, the magnetostrictive torque sensor 208 is of an increased length overall, thus making an electrically operated power steering apparatus that incorporates the magnetostrictive torque sensor 208 therein large in size.

Figure 20:
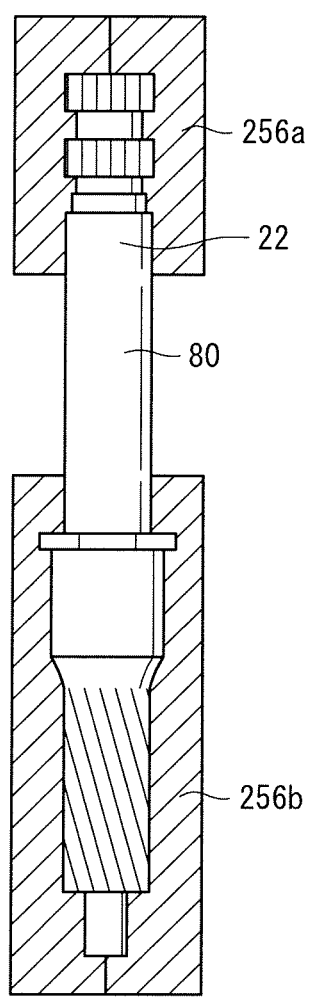
FIG. 20 is a view showing a process stage in which a magnetostrictive film is formed by masking a steering rod.

On the other hand, the first torque sensor 50A includes a plurality of different magnetic anisotropies (the first anisotropic area 108a and the second anisotropic area 108b), which are exhibited on a single magnetostrictive film 80 provided on the outer circumferential surface of the steering shaft member 22. Therefore, as shown in FIG. 20, only the first mask 256a and the second mask 256b are required (the third mask 256c is not required), and only upper and lower ends of the magnetostrictive film 80 have irregular film thicknesses. Further, since the first coil 82a and the second coil 82b may be positioned out of alignment with the two portions having irregular film thickness, the axial length of the magnetostrictive film 80 can be reduced, thereby making the first torque sensor 50A shorter than the conventional magnetostrictive torque sensor as a whole.

Differences in terms of specific dimensions between the first torque sensor 50A and the conventional magnetostrictive torque sensor 208 will be described below.

With a conventional magnetostrictive torque sensor 208, as shown in FIG. 14B, the portion of the first magnetostrictive film 244a, which is of uniform film thickness, has an axial length La in a range from 8 to 10 mm taking into consideration positional misalignment with the first coil 246a, and the portions (upper and lower end portions) thereof, which are of irregular film thickness, have respective axial lengths Lb1, Lb2 each in a range from 1 to 2 mm. The portion of the second magnetostrictive film 244b, which is of uniform film thickness, has an axial length Lc in a range from 8 to 10 mm taking into consideration positional misalignment with the second coil 246b, and the portions (upper and lower end portions) thereof, which are of irregular film thickness, have respective axial lengths Ld1, Ld2 each in a range from 1 to 2 mm. The gap 248 between the first magnetostrictive film 244a and the second magnetostrictive film 244b has a length Lg, which is governed by the dimension of the third mask 256c (see FIG. 15), and is in a range from 7 to 10 mm. Therefore, the length Le from the upper end of the first magnetostrictive film 244a to the lower end of the second magnetostrictive film 244b is in a range from 27 to 38 mm.

With the first torque sensor 50A, as shown in FIG. 14A, the portions (upper and lower end portions) of the magnetostrictive film 80, which are of irregular film thickness, have respective axial lengths Lf1, Lf2 each in a range from 1 to 2 mm. Therefore, the axial length Li of the portion of the magnetostrictive film 80, which is of uniform film thickness, is calculated by subtracting 2 to 4 mm from the overall length Lh of the magnetostrictive film 80. Since the axial center of the magnetostrictive film 80 is required to have a length Lj (=1 to 2 mm) large enough to differentiate between the magnetic anisotropies, the axial length Lk1 of the first anisotropic area 108a is set to 8 to 10 mm taking into consideration positional misalignment with the first coil 82a, and the axial length Lk2 of the second anisotropic area 108b is set to 8 to 10 mm taking into consideration positional misalignment with the second coil 82b, so that the length Lh of the magnetostrictive film 80 from an upper end to a lower end thereof is in a range from 19 to 26 mm, and hence is much smaller than the conventional length.

As described above, the axial length of the magnetostrictive film 80 of the first torque sensor 50A is much smaller than the conventional length, and as a result, the axial length of the overall steering shaft member 22 also is smaller. Therefore, an electrically operated power steering apparatus 10, which incorporates the first torque sensor 50A therein, is effectively reduced in size.

A process of manufacturing the first torque sensor 50A will be described below with reference to FIGS. 19 through 23.

Figure 19:
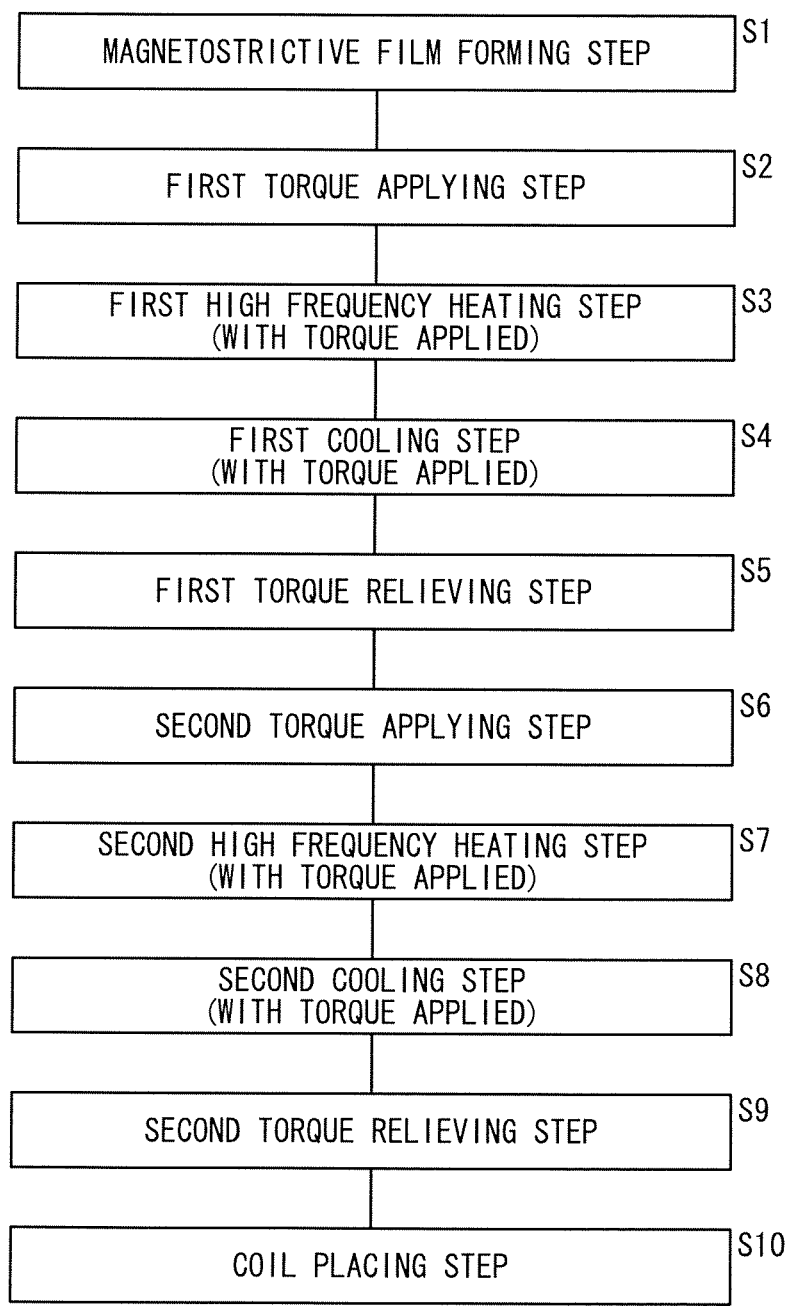
FIG. 19 is a block diagram showing a process of manufacturing a magnetostrictive torque sensor according to the present embodiment.

As shown in FIG. 19, the manufacturing process according to the present embodiment has a magnetostrictive film forming step S1, a first torque applying step S2, a first high frequency heating step S3 while torque is applied, a first cooling step S4 while torque is applied, a first torque relieving step S5, a second torque applying step S6, a second high frequency heating step S7 while torque is applied, a second cooling step S8 while torque is applied, a second torque relieving step S9, and a coil placing step S10.

In the magnetostrictive film forming step S1, as shown in FIG. 20, the first mask 256a is placed on one end of the steering shaft member 22, and the second mask 256b is placed from the other end of the steering shaft member 22 extending toward a longitudinally central portion thereof, leaving only a portion thereof where the magnetostrictive film 80 is exposed. It is not necessary to place the third mask 256c (see FIG. 15), as has been used heretofore. Thereafter, the steering shaft member 22 with the first mask 256a and the second mask 256b placed thereon is immersed in a plating bath. Then, the steering rod 210 is electroplated (for example, by an Ni—Fe plating process), thereby depositing the magnetostrictive film 80 to a thickness of about 40 μm.

Figures 21A, 21B:
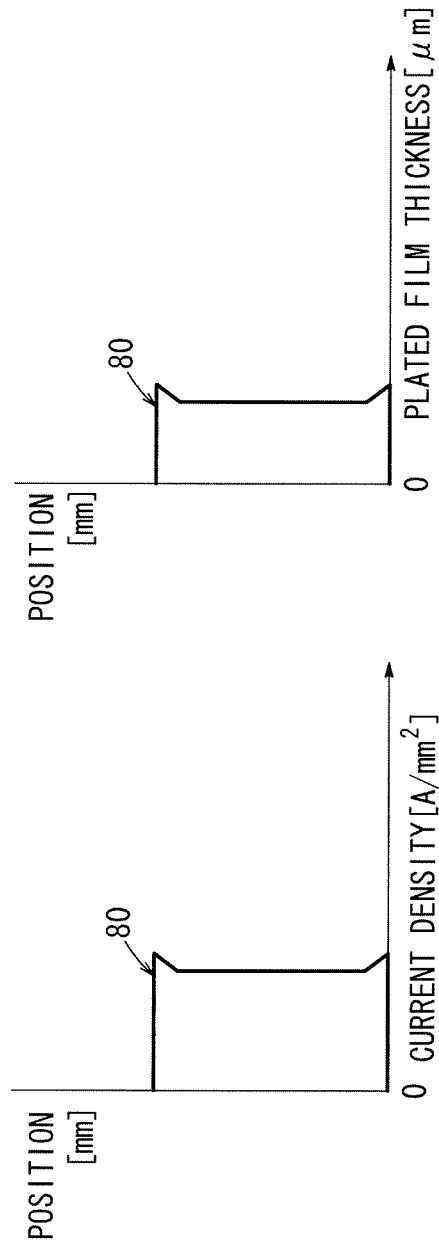
FIG. 21A is a characteristic diagram showing axial variations of current density on the surface of a plated film, in a process of plating a magnetostrictive film.
FIG. 21B is a characteristic diagram showing axial variations of thickness of the magnetostrictive film.

In the above plating process, electric field lines are concentrated at boundaries between the steering shaft member 22, which is an electric conductor, and the first and second masks 256a, 256b. Therefore, as shown in FIG. 21A, current densities are high at axial upper and lower ends of the exposed region of the steering shaft member 22 (where the magnetostrictive film 80 is formed). As a result, as shown in FIG. 21B, the magnetostrictive film 80 is locally thicker at the axial upper and lower ends, resulting in portions of irregular film thickness at the axial upper and lower ends of the magnetostrictive film 80.

In the first torque applying step S2, torsional torque is applied in one direction to the steering shaft member 22. Torsional torque that is applied to the steering shaft member 22 is in a range from 50 Nm to 100 Nm inclusive of the magnetostrictive film 80, which is chiefly made of iron nickel.

Figure 22A:
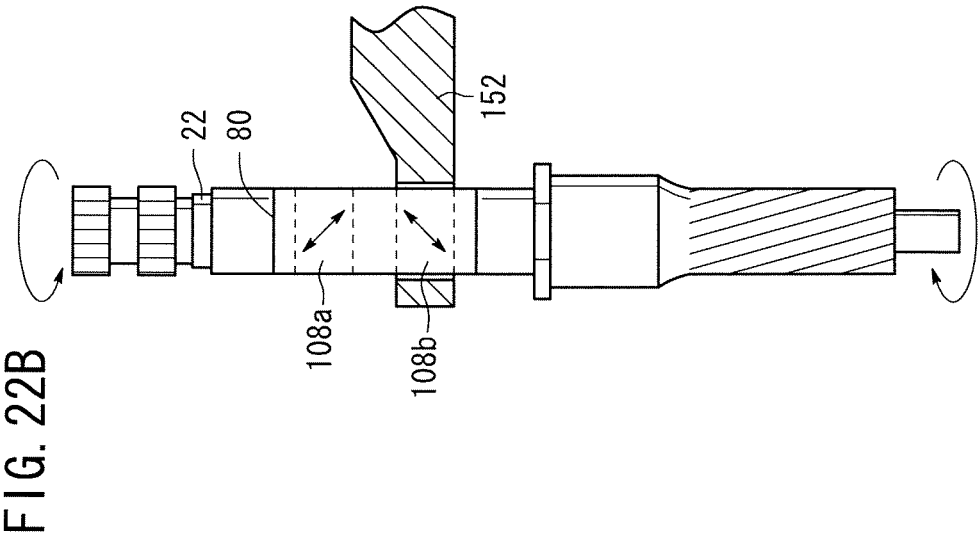
FIG. 22A is a view showing a process stage in which an upper portion of the magnetostrictive film is heated by high-frequency induction heating.

In the first high frequency heating step S3 while torque is applied, as shown in FIG. 22A, after the first mask 256a and the second mask 256b have been removed, the steering shaft member 22 is heated while torsional torque is applied thereto, for thereby applying a magnetic anisotropy in a given direction to an upper portion of the magnetostrictive film 80. The steering shaft member 22 is heated for a predetermined time by surrounding the upper portion of the magnetostrictive film 80 with a heating coil 152 and passing high-frequency current through the heating coil 152.

In the first cooling step S4 while torque is applied, the steering shaft member 22 is cooled to normal room temperature while torsional torque is applied thereto.

In the first torque relieving step S5, torsional torque is relieved from the steering shaft member 22 so as to make the upper portion of the magnetostrictive film 80 magnetically anisotropic. The upper portion of the magnetostrictive film 80 forms the first anisotropic area 108*a*.

In the second torque applying step S6, torsional torque is applied to the steering shaft member 22 in another direction (a direction opposite to the one direction referred to above). Torsional torque that is applied to the steering shaft member 22 is in a range from 50 Nm to 100 Nm inclusive.

Figure 22B:
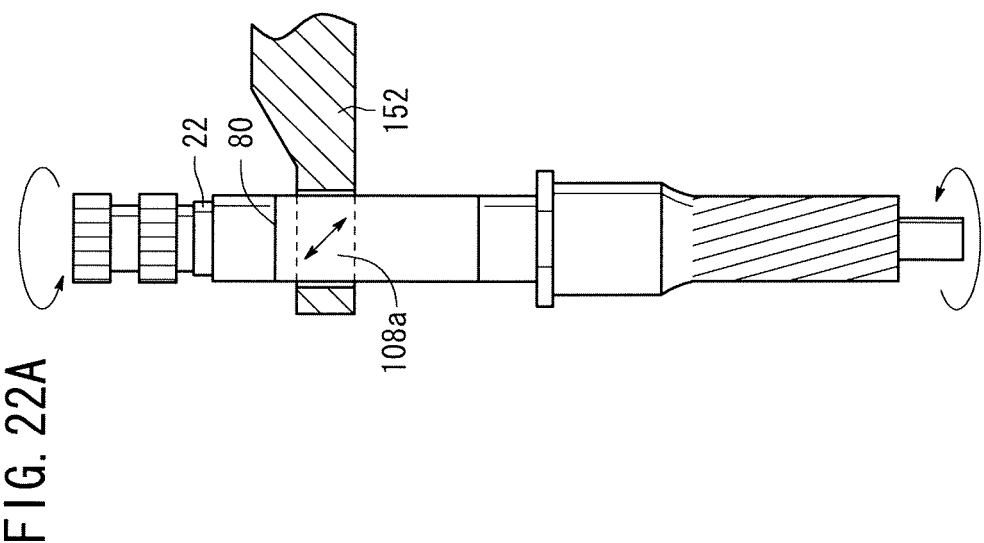
FIG. 22B is a view showing a process stage in which a lower portion of the magnetostrictive film is heated by high-frequency induction heating.

In the second high frequency heating step S7, while torque is applied, as shown in FIG. 22B, the steering shaft member 22 is heated while torsional torque is applied thereto. Thus, a magnetic anisotropy in a given direction is applied to a lower portion of the magnetostrictive film 80. The steering shaft member 22 is heated for a predetermined time by surrounding the lower portion of the magnetostrictive film 80 with the heating coil 152, and by passing a high-frequency current through the heating coil 152.

In the second cooling step S8 while torque is applied, the steering shaft member 22 is cooled to normal room temperature while the torsional torque is applied thereto.

In the second torque relieving step S9, torsional torque is relieved from the steering shaft member 22 in order to make the lower portion of the magnetostrictive film 80 magnetically anisotropic. The lower portion of the magnetostrictive film 80 forms the second anisotropic area 108*b*.

In the coil placing step S10, coils in the form of multiple windings (the first coil 82*a* and the second coil 82*b*) for detecting changes in magnetostrictive characteristics are placed around the magnetostrictive film 80.

The first torque sensor 50A according to the present embodiment is fabricated by carrying out the above steps.

Details of major ones of the above steps, i.e., the torque applying step (S2, S6), the high frequency heating step (S3, S7), the cooling step (S4, S8), and the torque relieving step (S5, S9), will be described below.

The steering shaft member 22 is made of chromium molybdenum steel (JIS-G-4105, Symbol: SCM), for example. The magnetostrictive film 80 is an Ni—Fe alloy film plated on the outer circumferential surface of the steering shaft member 22. The alloy film has a thickness, which preferably ranges from 5 to 40 μm. If the Ni—Fe alloy film contains about 35% by weight of Fe, then the Ni—Fe alloy tends to produce a high magnetostrictive effect as the magnetostrictive constant becomes large. Therefore, a material with such an Fe content should preferably be used.

As shown in FIG. 22A, an anisotropy in one direction is applied to the magnetostrictive film 80. More specifically, the heating coil 152 is placed around the upper portion of the magnetostrictive film 80 (which becomes the first anisotropic area 108*a*), and a torsional torque of 100 Nm, for example, is applied in one direction to the steering shaft member 22 (the first torque applying step S2). While torsional torque is applied in one direction, a current having a high frequency in a range from 500 kHz to 3 MHz passes through the heating coil 152 for 1 to 10 seconds, thereby heating the upper portion of the magnetostrictive film 80 by way of high-frequency induction heating (the first high frequency heating step S3).

Figure 23:
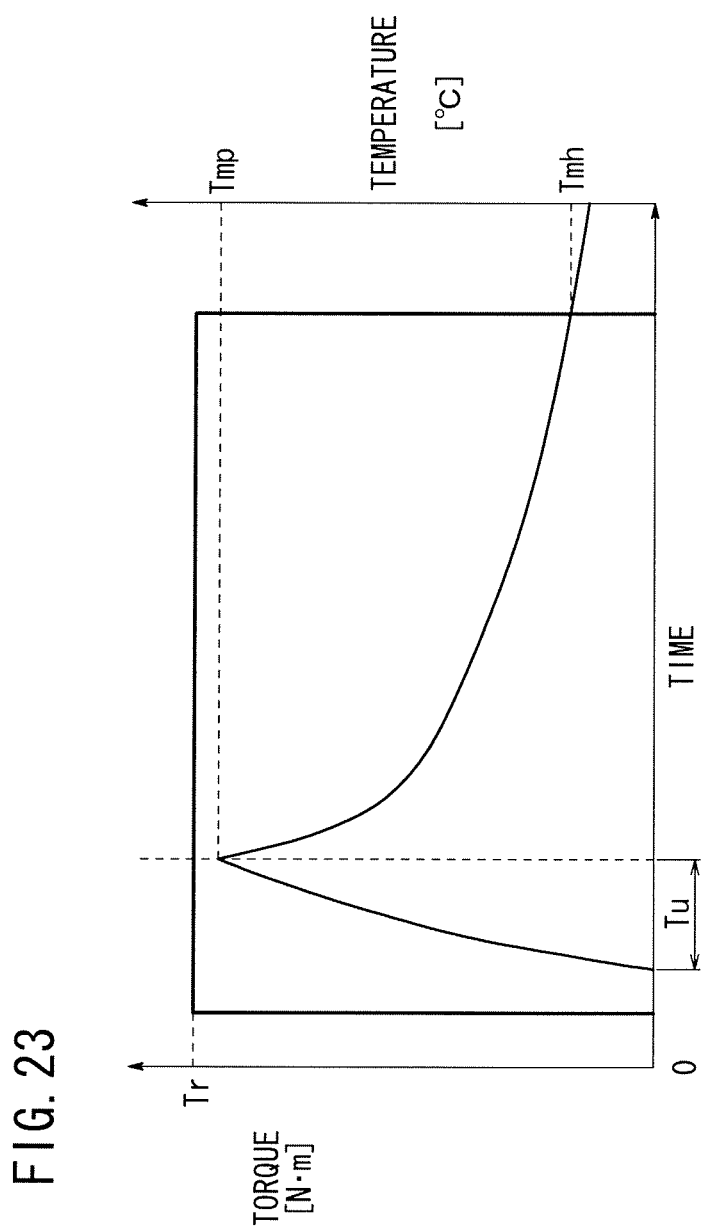
FIG. 23 is a sequence diagram showing a timing sequence upon application of torque to the steering rod, high-frequency induction heating, cooling, and removal of the torque.

FIG. 23 is a sequence diagram showing a timing sequence upon application of torque to the steering shaft member 22, as well as during high-frequency induction heating, cooling, and removal of the torque. The horizontal axis represents time and the vertical axis represents the applied torque or temperature. Before high-frequency current is supplied, a torsional torque Tr is applied to the steering shaft member 22. Thereafter, high-frequency current is passed through the heating coil 152 for a time Tu (=1 to 10 seconds). When the temperature of the upper portion of the magnetostrictive film 80 rises up to a temperature Tmp (300° C.), passage of high-frequency current through the heating coil 152 is stopped. Then, the steering shaft member 22 is cooled while the torsional torque Tr is applied thereto (the first cooling step S4). The steering shaft member 22 may be cooled naturally. When the temperature of the upper portion of the magnetostrictive film 80 decreases to a temperature Tmh (for example, room temperature), application of the torsional torque Tr is stopped (the first torque relieving step S5). Throughout these steps, the first anisotropic area 108*a* is formed at an upper portion of the magnetostrictive film 80.

Then, anisotropy in another direction is applied to the magnetostrictive film 80. More specifically, the heating coil 152 is placed around the lower portion of the magnetostrictive film 80 (which becomes the second anisotropic area 108*b*), and a torsional torque of 100 Nm, for example, is applied in another direction (which is opposite to the one direction) to the steering shaft member 22 (the second torque applying step S6). While the torsional torque is applied in the other direction, a current having a high frequency in a range from 500 kHz to 3 MHz passes through the heating coil 152 for Tu=1 to 10 seconds, thereby heating the upper portion of the magnetostrictive film 80 by way of high-frequency induction heating (the second high frequency heating step S7). Thereafter, in the same manner as described above, when the temperature of the lower portion of the magnetostrictive film 80 rises up to a temperature Tmp (300° C.), passage of high-frequency current through the heating coil 152 is stopped. Then, the steering shaft member 22 is cooled while the torsional torque Tr is applied thereto (the second cooling step S8). When the temperature of the lower portion of the magnetostrictive film 80 decreases to a temperature Tmh (for example, room temperature), application of the torsional torque is stopped (the second torque relieving step S9). Throughout these steps, the second anisotropic area 108*b* is formed at a lower portion of the magnetostrictive film 80.

Since the magnetostrictive film 80 is heated by way of high-frequency induction, it is possible to heat the magnetostrictive film 80 locally, as shown in FIGS. 22A and 22B, thus making it possible to provide a plurality of different magnetic anisotropies accurately on a single magnetostrictive film 80.

Further preferred examples of the first torque sensor 50A will be described below with reference to FIGS. 24 through 28.

Figure 24:
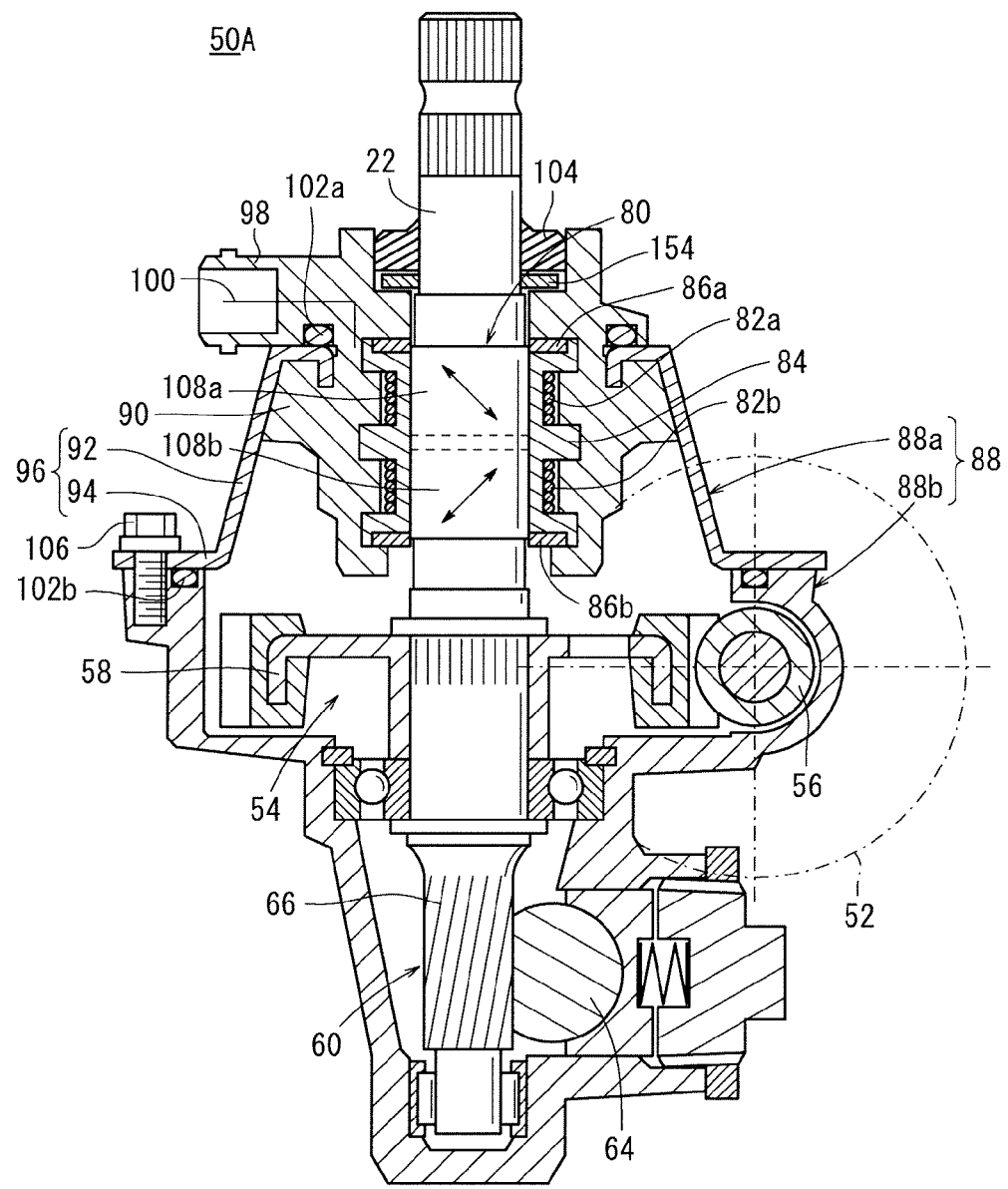
FIG. 24 is a side elevational view of a first preferred specific example of the first torque sensor partially illustrated in cross section.
Figure 25:
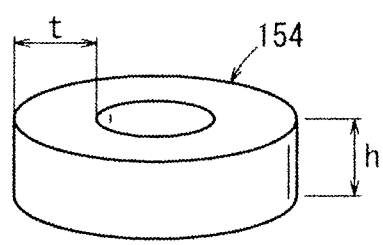
FIG. 25 is a perspective view of a ring, which is secured to the steering shaft, in the first torque sensor.

According to a first preferred specific example, as shown in FIG. 24, a ring 154 is fixed to the steering shaft member 22 at a position near one end thereof. For example, the ring 154 may be fixed to the steering shaft member 22 between the upper end of the magnetostrictive film 80 and the lower end of the sealing member 104. The upper end of the ring 154 is spaced from the lower end of the sealing member 104, by a distance in a range from 0 mm to 5 mm inclusive. The ring 154 is made of a nonmagnetic material, which is a good electric conductor (having a small electrical resistance), e.g., gold (Au), silver (Ag), copper (Cu), aluminum (Al), or the like, and has a small volume resistivity. In this example, the ring 154 is made of Al. The ring 154 should preferably have a thickness large enough to generate eddy currents radially outwardly of the steering shaft member 22. For example, as shown in FIG. 25, the ring 154 has an axial length h in a range from 1 to 5 mm, and a radial thickness t in a range from 1 to 5 mm, although the ring 154 may have other dimensions.

Operations of the ring 154 will be described below.

Figure 26A:
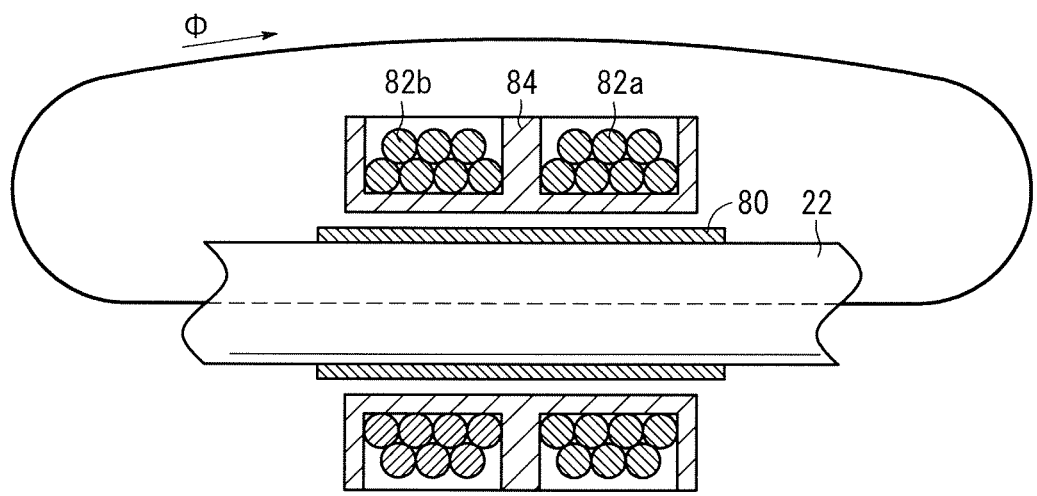
FIG. 26A is a view showing the manner in which alternating magnetic fluxes pass through the steering rod in an ordinary magnetostrictive torque sensor.
Figure 26B:
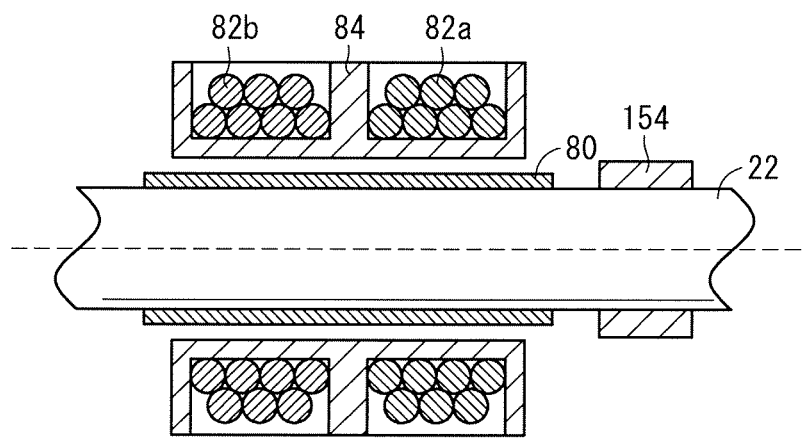
FIG. 26B is a view showing the manner in which alternating magnetic fluxes are prevented from passing through the steering rod in the first torque sensor.

When the first torque sensor 50A is installed near a rotary machine such as an engine, an electric generator, an industrial motor, or the like, magnetic fluxes φ of the rotary machine leak and pass through the base material of the steering shaft member 22, as shown in FIG. 26A. However, since the first torque sensor 50A shown in FIG. 24 includes the ring 154 on the steering shaft member 22, leaking magnetic fluxes from the rotary machine do not pass through the base material of the steering shaft member 22, as shown in FIG. 26B.

More specifically, when the alternating magnetic fluxes φ shown in FIG. 26A pass through the steering shaft member 22 into the ring 154, the alternating magnetic fluxes φ induce eddy currents in the ring 154, which generate magnetic fluxes in a direction that cancels out the alternating magnetic fluxes φ that tend to pass through the steering shaft member 22. As a result, alternating magnetic fluxes φ are effectively prevented from passing through the steering shaft member 22. Since the ring 154 has a small electrical resistance, a portion of such alternating magnetic fluxes φ is consumed as heat. Alternating magnetic fluxes φ that are prevented from passing through the steering shaft member 22 are directed through another path. The smaller the volume resistivity of the ring 154, the greater the eddy currents that are generated in the ring 154, and hence passage of alternating magnetic fluxes φ through the steering shaft member 22 is prevented more effectively. If rings 154 are disposed respectively near opposite ends of the magnetostrictive film 80, then the rings are more effective at preventing alternating magnetic fluxes φ from passing through the steering shaft member 22.

Since the first torque sensor 50A prevents alternating magnetic fluxes φ from passing through the steering shaft member 22, a sensor signal output from the first torque sensor 50A essentially is not affected by alternating magnetic fluxes φ, and hence the first torque sensor 50A is prevented from causing noise-induced vibrations or producing abnormal sounds.

Furthermore, since there is no need for the first torque sensor 50A to have a low-pass filter to remove abnormal sounds, the first torque sensor 50A is free from signal delays, which otherwise would be caused by such a low-pass filter, and the first torque sensor 50A can produce an output signal that is highly responsive, i.e., which exhibits a wide dynamic range. Inasmuch as the ring 154 is made of aluminum, the ring 154 can easily be fabricated and assembled in place. Since aluminum is more inexpensive and available than gold or silver, the first torque sensor 50A can be fabricated at a low cost, and can be supplied to the market in a stable fashion.

Since the ring 154 is of a hollow tubular shape, the ring 154 may be mounted directly on the steering shaft member 22, or may be disposed near the first coil 82a or the second coil 82b. The ring 154 can thus be installed in locations with a high degree of freedom, and does not require adjustment. Consequently, the first torque sensor 50A can be fabricated easily and can be reduced in size.

Since the ring 154 is in the form of a member fabricated separately from the steering shaft member 22, one or more rings 154 can be installed more freely in positions where such rings can effectively prevent alternating magnetic fluxes φ from passing through the steering shaft member 22, than if the ring 154 were formed integrally with the steering shaft member 22. Consequently, the first torque sensor 50A can easily be fabricated.

Figure 27:
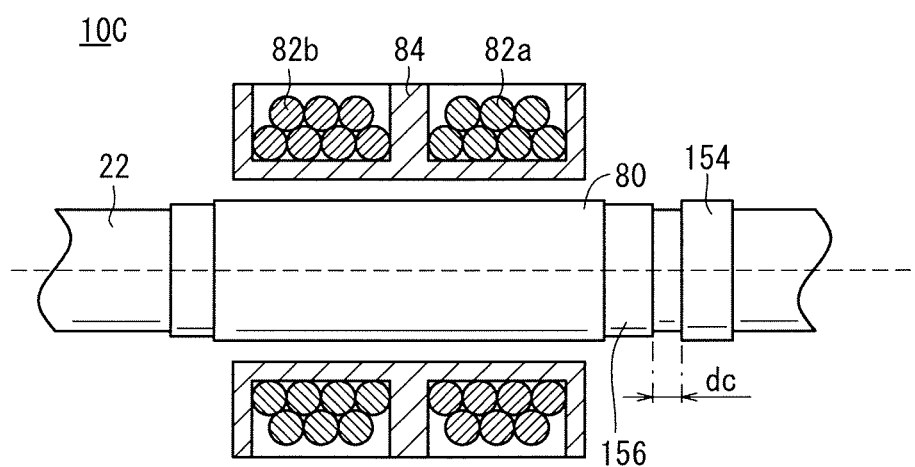
FIG. 27 is a side elevational view showing a structure having an intermediate film in the first torque sensor partially in cross section.

As shown in FIG. 27, an intermediate film 156 is interposed between the magnetostrictive film 80 and the steering shaft member 22. The intermediate film 156 is made of tin (Sn), lead (Pb), bismuth (Bi), indium (In), or cadmium (Cd), or an alloy including any one of these metals as a chief component. Since the steering shaft member 22 needs to be mechanically strong, the steering shaft member 22 is made of an iron alloy as a base material, and is easily magnetizable since strength is achieved by applying a heat treatment thereto.

The ring 154, which is of a hollow tubular shape, is integrally secured to the steering shaft member 22 by press-fitting in the vicinity of the magnetostrictive film 80, e.g., in the vicinity of the right end of the intermediate film 156 shown in FIG. 27. The ring 154 is effective at preventing alternating magnetic fluxes φ from passing through the steering shaft member 22. The distance dc from the right end of the intermediate film 156 to the left end of the ring 154 should preferably be in a range from 0 to 10 mm, but may be greater. In FIG. 27, the ring 154 may be disposed in the vicinity of the left end of the intermediate film 156, or alternatively, rings 154 may be disposed respectively in the vicinity of opposite ends of the intermediate film 156.

Figure 28:
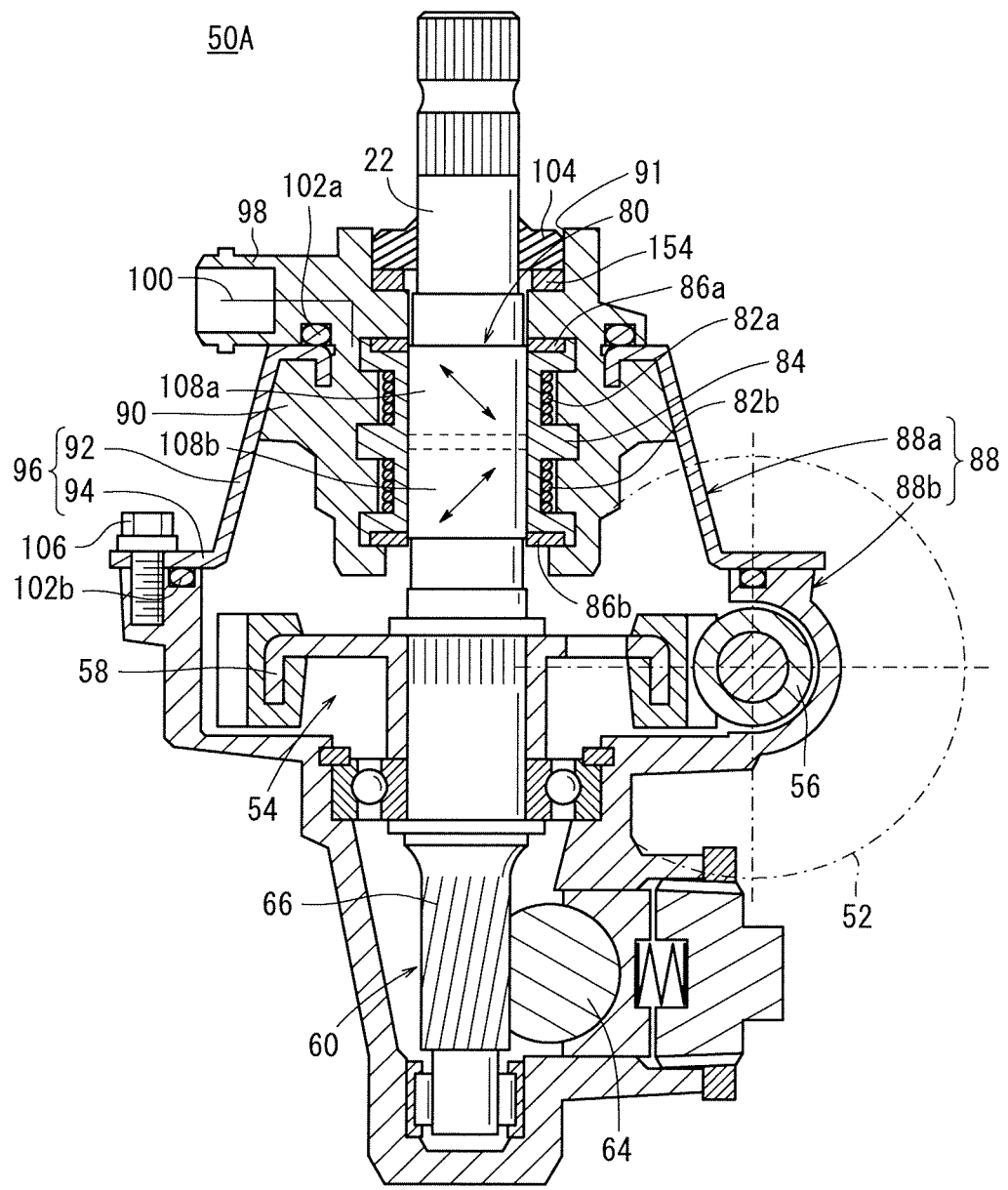
FIG. 28 is a side elevational view of a second preferred specific example of the first torque sensor partially illustrated in cross section.

A second preferred specific example will be described below. As shown in FIG. 28, the second preferred specific example differs from the first preferred specific example, in that the ring 154, which is of a hollow tubular shape, is fixed to an inner wall surface of the resin part 90 of the first housing member 88a, near an upper opening 91 of the resin part 90. More specifically, the ring 154 is fixed in position between the sealing member 104 disposed near the opening 91 and the resin part 90. The ring 154 may also be fixed in position near the worm wheel 58, in addition to being near the opening 91. According to the second preferred specific example, as with the first preferred specific example, since the first torque sensor 50A prevents alternating magnetic fluxes φ from passing through the steering shaft member 22, a sensor signal, which is output from the first torque sensor 50A, essentially is not affected by alternating magnetic fluxes φ, and hence the first torque sensor 50A is prevented from causing noise-induced vibrations or producing abnormal sounds.

Figure 29:
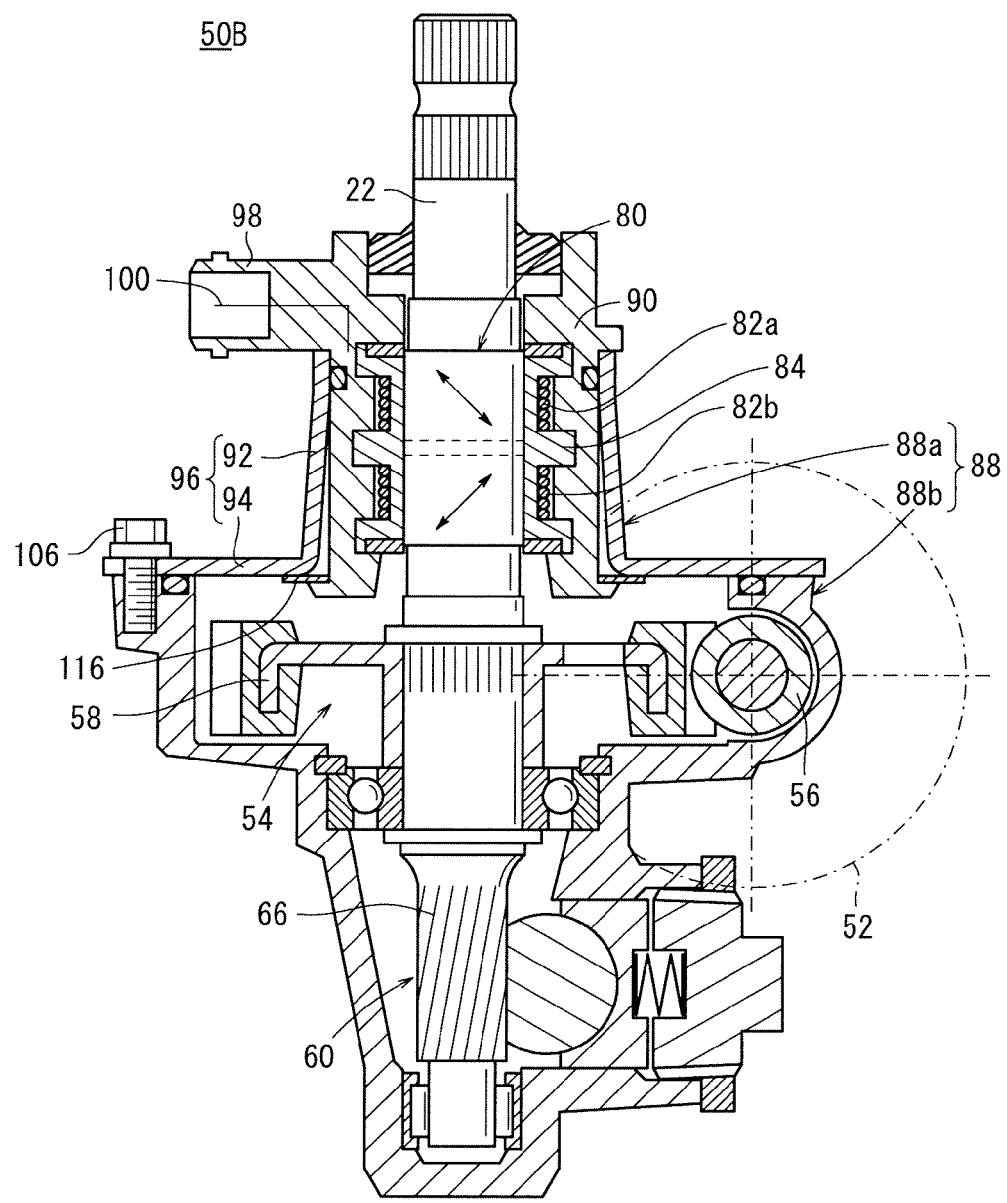
FIG. 29 is a side elevational view of a second torque sensor partially illustrated in cross section.
Figure 30:
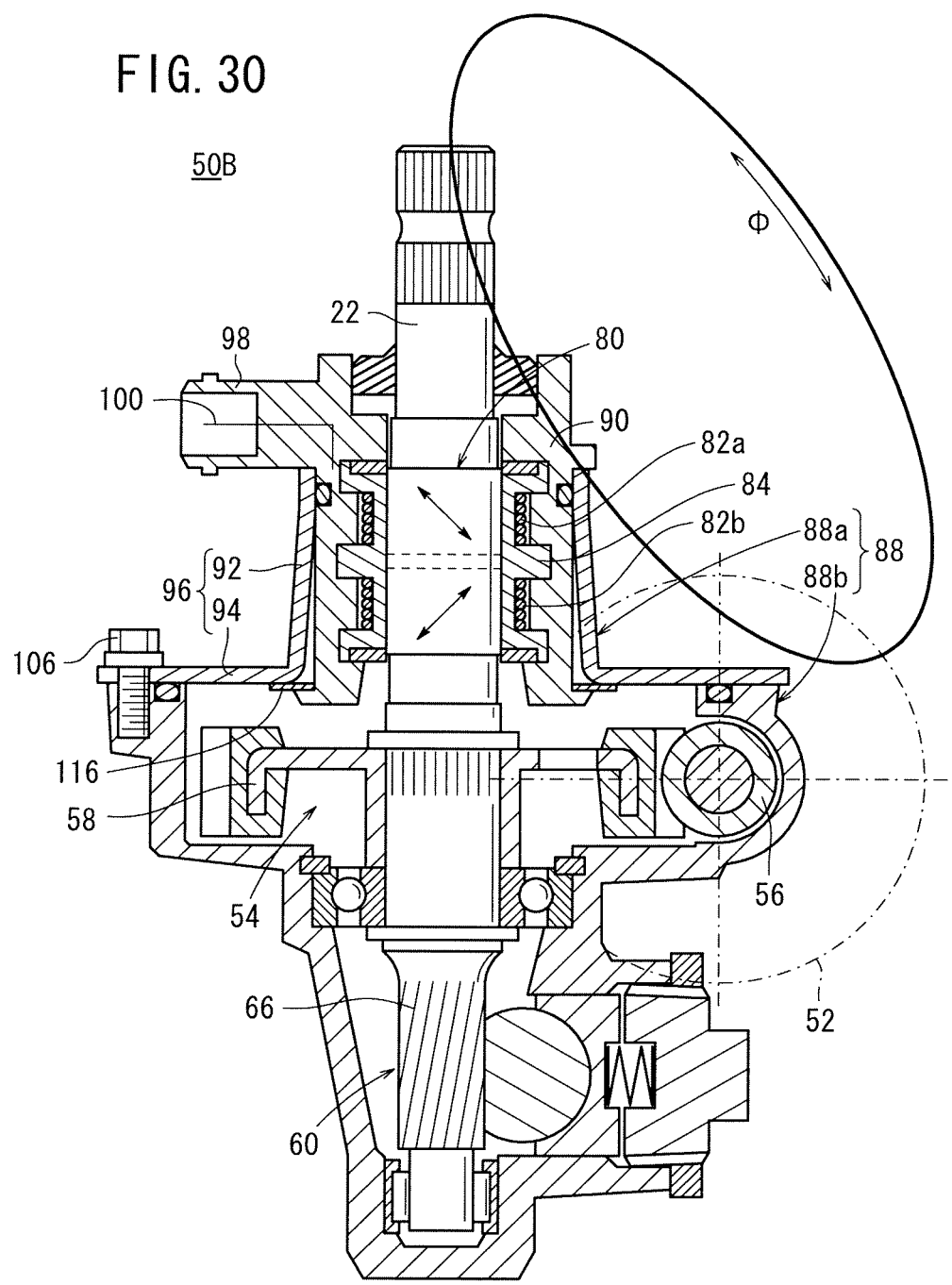
FIG. 30 is a view showing an action of the second torque sensor on alternating magnetic fluxes.
Figure 31:
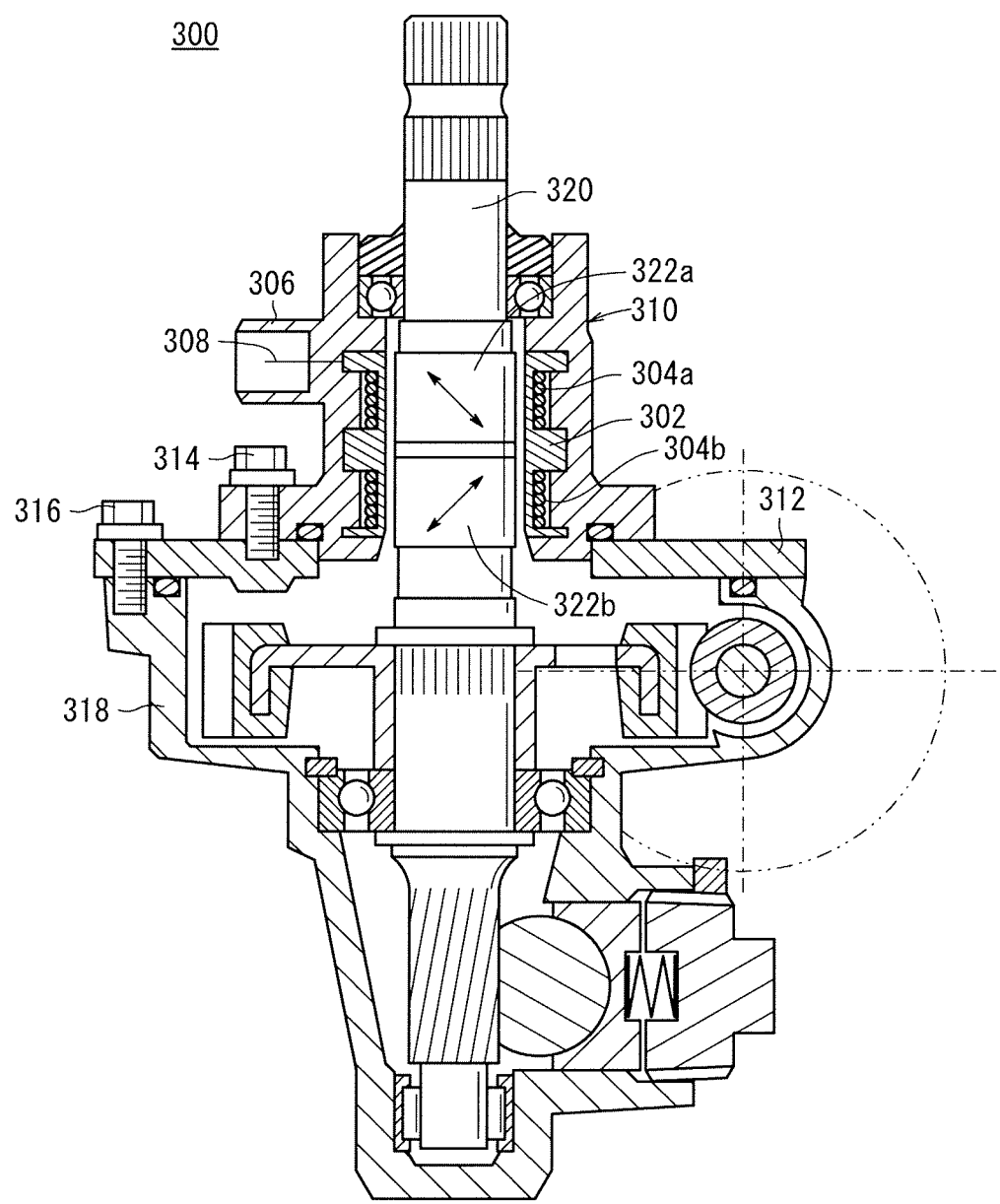
FIG. 31 is a side elevational view of a torque sensor, partially illustrated in cross section, according to a proposal.
Figure 32:
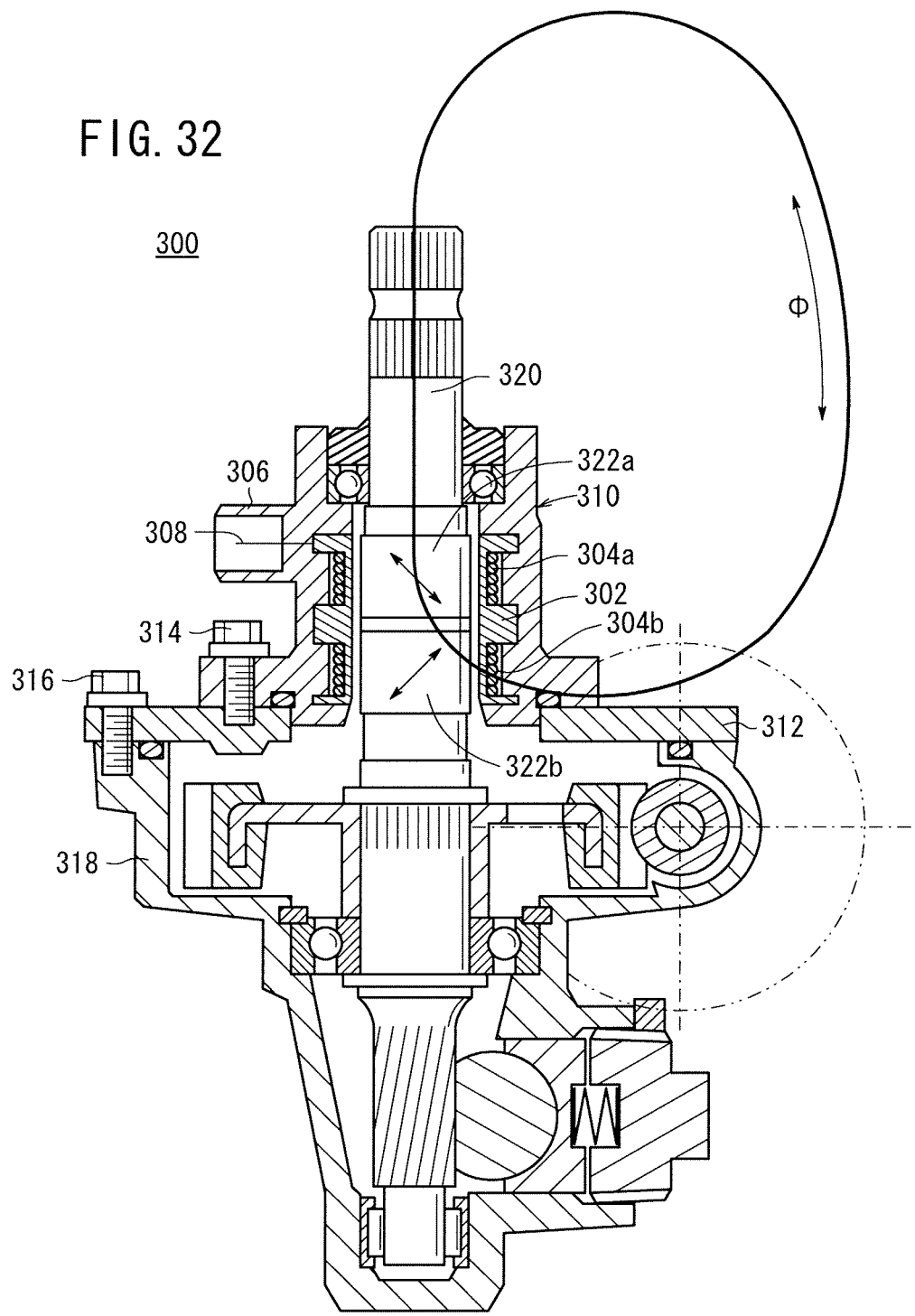
FIG. 32 is a view showing an action of the torque sensor on alternating magnetic fluxes according to the proposal.

A magnetostrictive torque sensor (hereinafter referred to as a "second torque sensor 50B") according to a second embodiment will be described below with reference to FIGS. 29 and 30.

The second torque sensor 50B is substantially of the same structure as the first torque sensor 50A described above, but differs therefrom as to the structure of the metal member 96, which includes the tubular part 92 and the flange 94.

The metal member 96 is not encased within the resin part 90. The metal member 96, which is substantially L-shaped in vertical cross section, is mounted in position with an upper end face thereof held against a flange that includes the lower surface of the connector 98 of the resin part 90, the tubular part 92 is pressed against the resin part 90, and the flange 94 is fastened by bolts 106 to the second housing member 88b. The tubular part 92 is inclined slightly with respect to the axial direction of the steering shaft member 22, as viewed in vertical cross section. A ring-shaped adjustment plate 116 is interposed between the bent portion of the metal member 96 and the resin part 90, so that the upper end face of the metal member 96 is maintained and held reliably against the flange of the resin part 90.

While the first torque sensor 50A includes the metal member 96 made of an iron alloy, the second torque sensor 50B includes the metal member 96 (and the adjustment plate 116) made of a nonmagnetic electric conductor (e.g., an aluminum alloy, a copper alloy, or the like). It is assumed that the metal member 96 is made of an aluminum alloy.

As described above, the metal member 96 includes the tubular part 92, which has a gradient inclined slightly with respect to axial directions of the steering shaft member 22, as viewed in vertical cross section, and the flange 94. Since the aluminum alloy is nonmagnetic, alternating magnetic fluxes φ do not pass through the metal member 96. When alternating magnetic fluxes φ pass through the tubular part 92, an eddy current flows circumferentially within the tubular part 92, thereby preventing alternating magnetic fluxes φ from passing therethrough. The greater the electric conductivity (the lower the electric resistance) is, the more effective that alternating magnetic fluxes φ are prevented from passing through the tubular part 92. Therefore, a copper alloy is more effective than an aluminum alloy, and silver and gold are more effective than a copper alloy.

If the tubular part 92 is made of a nonmagnetic electric conductor, e.g., an aluminum alloy, then the tubular part 92 is sufficiently effective, without having any gradient in the vertical cross-sectional shape thereof.

In the second torque sensor 50B, as with the first torque sensor 50A, the resin part 90 houses therein the bobbin 84 including the first coil 82a and the second coil 82b wound therearound, and the resin part 90 is molded of resin integrally with the connector 98, which houses the pins 100 to which various ends of the first coil 82a and the second coil 82b are connected. Therefore, the various ends of the first coil 82a and the second coil 82b are kept out of contact with other metal members, thereby solving a conduction failure.

Gasoline automobiles and motor-powered electric automobiles, for example, incorporate therein electromagnetic devices including an electric generator, a fuel injector solenoid, an electric motor, etc., disposed around the torque sensor. As indicated by the solid line in FIG. 30, alternating magnetic fluxes φ pass outside of the aluminum alloy metal member 96 (the tubular part 92 and the flange 94) of the housing 88 and pass through the one end of the steering shaft member 22. Since such alternating magnetic fluxes φ do not pass through the magnetostrictive film 80, the first coil 82a, or the second coil 82b, but rather pass through positions located farther therefrom, the problem of noise, which is added to the detected signals representing the first detected voltage, the second detected voltage, etc., can be solved more effectively.

Owing to the second torque sensor 50B incorporated in the electrically operated power steering apparatus 10, noise-induced vibrations are not transmitted from the motor 52, which assists the driver in turning the steering wheel 12, so that the driver can experience a smooth steering sensation.

According to the background art, noise must be removed by a low-pass filter. Since the second torque sensor 50B does not require a low-pass filter, the second torque sensor 50B is free of any delay caused by such a low-pass filter. Therefore, the second torque sensor 50B increases the response of detected signals representative of the first detected voltage, the second detected voltage, etc., generates output signals (detected torque data DT3) having a wide dynamic range, and provides the driver with a smooth steering sensation, which does not delay assistance provided by the motor 52.

The second torque sensor 50B also is advantageous in that the second torque sensor 50B does not magnetically adversely affect other sensors on and around the steering rod, such as a steering angle sensor, etc.

In the above embodiment, a single magnetostrictive film 80 is deposited on the steering shaft member 22, and the magnetostrictive film 80 has the first anisotropic area 108a and the second anisotropic area 108b, which are opposite to each other. Alternatively, two magnetostrictive films (a first magnetostrictive film and a second magnetostrictive film) having different magnetic anisotropies may be deposited on the steering shaft member 22.

The second torque sensor 50B may also employ the first preferred specific example and the second preferred specific example shown in FIGS. 24 through 28.

The magnetostrictive torque sensor and the electrically operated power steering apparatus according to the present invention are not limited to the above embodiments, but may adopt various other arrangements therein without departing from the scope of the invention.

The invention claimed is:

1. A magnetostrictive torque sensor comprising a magnetostrictive member disposed on a shaft member, coils for detecting a change in a magnetic property of the magnetostrictive member, and a housing housing at least the shaft member, the magnetostrictive member, and the coils therein,
wherein the housing includes a resin part, a tapered part made of metal, and a flange made of metal, the resin part, the tapered part, and the flange being formed together integrally, and
wherein the tapered part is inclined with respect to an axial direction of the shaft member.

2. The magnetostrictive torque sensor according to claim 1, wherein the tapered part is made of a soft magnetic metal, and the flange is made of a soft magnetic metal.

3. The magnetostrictive torque sensor according to claim 1, wherein the tapered part is made of a nonmagnetic metal, and the flange is made of a nonmagnetic metal.

4. The magnetostrictive torque sensor according to claim 1, wherein the tapered part and the flange are integrally made of the same metal.

5. The magnetostrictive torque sensor according to claim 1, wherein the housing comprises:
a first housing member disposed near an end of the shaft member, at a position housing therein the magnetostrictive member and the coils, the first housing member having the resin part, the tubular part, and the flange; and
a second housing member made of metal disposed near another end of the shaft member;
the tubular part being positioned within a region of the first housing member, which houses the coils therein;
the flange being positioned at a junction between the first housing member and the second housing member; and
the resin part being positioned between the coils and the tubular part.

6. The magnetostrictive torque sensor according to claim 1, wherein the magnetostrictive member and the coils are disposed near one end of the shaft member; and
the tubular part has an opening near the one end of the shaft member and an opening near another end of the shaft member the opening near the one end of the shaft member being smaller in size than the opening near the other end of the shaft member.

7. The magnetostrictive torque sensor according to claim 1, wherein the housing further comprises:
an external connection member for electrical connection to an external device, the external connection member housing therein a pin to which leading ends of the coils are connected, and a pin to which trailing ends of the coils are connected;
the external connection member being integrally formed together with the resin part.

8. The magnetostrictive torque sensor according to claim 1, further comprising:

soft magnetic metal members disposed in the vicinity of the coils.

9. The magnetostrictive torque sensor according to claim 8, wherein the soft magnetic metal members are of a hollow tubular shape.

10. The magnetostrictive torque sensor according to claim 8, wherein the soft magnetic metal members comprise members that are fabricated separately from the shaft member.

11. The magnetostrictive torque sensor according to claim 8, wherein the soft magnetic metal members are disposed axially at opposite ends of the coils.

12. The magnetostrictive torque sensor according to claim 8, wherein the soft magnetic metal members each have a slit defined therein.

13. The magnetostrictive torque sensor according to claim 8, wherein the housing has an opening in an axial direction of the shaft member, the soft magnetic metal members being disposed in the opening.

14. An electrically operated power steering apparatus for applying power of a motor to a steering system of a vehicle to reduce a steering torque, which is generated when a driver of the vehicle turns a steering wheel of the vehicle, the electrically operated power steering apparatus including a steering torque sensor for detecting steering torque, wherein the steering torque sensor comprises:

a magnetostrictive film disposed on a steering shaft member, coils for detecting a change in a magnetic property of the magnetostrictive film, and a housing housing therein at least the steering shaft member, the magnetostrictive film, and the coils, wherein the housing includes a resin part, a tapered part made of metal, and a flange made of metal, the resin part, the tapered part, and the flange being formed together integrally, and wherein the tapered part is inclined with respect to an axial direction of the shaft member.

* * * * *